(12) United States Patent
Rothenburg

(10) Patent No.: US 8,175,733 B2
(45) Date of Patent: *May 8, 2012

(54) MODELING MANUFACTURING PROCESSES TO INCLUDE DEFINED MARKERS

(75) Inventor: Mario Rothenburg, Eppelheim (DE)

(73) Assignee: SAP AG, Walldorf (DE)

(*) Notice: Subject to any disclaimer, the term of this patent is extended or adjusted under 35 U.S.C. 154(b) by 247 days.

This patent is subject to a terminal disclaimer.

(21) Appl. No.: 12/188,905

(22) Filed: Aug. 8, 2008

(65) Prior Publication Data

US 2009/0099676 A1    Apr. 16, 2009

Related U.S. Application Data

(63) Continuation of application No. 11/375,633, filed on Mar. 14, 2006, now Pat. No. 7,412,295.

(51) Int. Cl.
*G06F 19/00* (2011.01)
*G06F 9/44* (2006.01)

(52) U.S. Cl. ............ 700/97; 700/95; 700/105; 700/107; 700/110; 700/14; 710/30; 705/7.11; 705/7.41; 705/7.37; 702/176; 703/6; 703/7; 703/22; 706/19; 706/25; 707/200

(58) Field of Classification Search ............... 710/30
See application file for complete search history.

(56) References Cited

U.S. PATENT DOCUMENTS

| | | |
|---|---|---|
| 5,231,567 A | 7/1993 | Matoba et al. |
| 5,303,144 A | 4/1994 | Kawashima et al. |
| 5,764,543 A | 6/1998 | Kennedy |
| 5,787,000 A | 7/1998 | Lilly et al. |
| 6,345,259 B1 | 2/2002 | Sandoval |
| 6,360,188 B1 | 3/2002 | Freidman et al. |
| 6,546,300 B1 | 4/2003 | Fukuda et al. |
| 6,606,527 B2 | 8/2003 | Andrade et al. |
| 6,839,601 B1 | 1/2005 | Yazback et al. |
| 6,898,472 B2 | 5/2005 | Crampton et al. |
| 7,023,440 B1 * | 4/2006 | Havekost et al. ............. 345/440 |
| 7,139,719 B1 | 11/2006 | Cherneff et al. |
| 7,162,318 B1 | 1/2007 | Brearley et al. |
| 7,218,980 B1 * | 5/2007 | Orshansky et al. ............. 700/99 |
| 7,337,032 B1 * | 2/2008 | Nettles et al. ................ 700/100 |

(Continued)

OTHER PUBLICATIONS

Ying Li et al , "Extracting state marks in Planning", Jun. 2006, Proceedings of the 6th World Congress on Intelligent Control, pp. 1-5.*

(Continued)

*Primary Examiner* — Ramesh Patel
*Assistant Examiner* — Olvin Lopez Alvarez
(74) *Attorney, Agent, or Firm* — Fish & Richardson P.C.

(57) ABSTRACT

A method, and corresponding computer program product and system, defines and uses marker points within a modeled manufacturing process routing that includes multiple sequenced operations. The method includes receiving user input that defines one or more marker points within the modeled manufacturing process routing and between sequential ones of the operations. The marker points define a user-defined point within a manufacturing process and include one of multiple defined types that each define a different use to be made by the marker point. The method also includes detecting if any marker points of a specified one of the defined types have been defined in the manufacturing process routing. If a marker point having the specified one of the defined types is detected, a predefined computing function is executed that uses the detected marker point.

6 Claims, 23 Drawing Sheets

U.S. PATENT DOCUMENTS

| | | | |
|---|---|---|---|
| 7,451,011 B2* | 11/2008 | Funk et al. | 700/121 |
| 7,483,762 B2* | 1/2009 | Muro et al. | 700/108 |
| 7,533,043 B2* | 5/2009 | Carney et al. | 705/28 |
| 7,730,022 B2* | 6/2010 | Laub et al. | 707/603 |
| 2003/0016672 A1* | 1/2003 | Rosen et al. | 370/392 |
| 2003/0220707 A1* | 11/2003 | Budinger et al. | 700/97 |
| 2006/0288332 A1* | 12/2006 | Sagar et al. | 717/124 |
| 2007/0219835 A1 | 9/2007 | Steinbach et al. | |
| 2007/0219929 A1 | 9/2007 | Steinbach | |
| 2009/0112343 A1* | 4/2009 | Yuan et al. | 700/101 |

OTHER PUBLICATIONS

Lu et al , "Computer Aided Process planning system based on workflow technology and integarted bill of material tree", Springer, 2006, pp. 1-8.*

Chin et al, "A Hybrid rough cut process planing for quality", 2003, pp. 1-11.*

Federal Register, "Supplementary Examination guidelines for Determining Compliance with USC 112", Feb. 9, 2011, vol. 76 No. 27, pp. 7162-7175.*

\* cited by examiner

MODELING MANUFACTURING PROCESSES TO INCLUDE DEFINED MARKERS

CROSS-REFERENCE TO RELATED APPLICATIONS

This application is a continuation of U.S. Ser. No. 11/375,633, filed on Mar. 14, 2006, hereby incorporated by reference.

TECHNICAL FIELD

This invention relates to modeling manufacturing processes for manufacturing and execution computing systems.

BACKGROUND

A manufacturing planning and execution computing system may be used in a manufacturing environment that produces products according to a demand for those products. Such a system is able to control and track the operation of the manufacturing process, and uses predefined manufacturing process master data that typically is made up of many defined execution operations. Each of the separate execution operation definitions may include, for example, what the inputs to the operation are, what machinery (or resource) must, or may, be used in the operation, and what the output of the operation is. This predefined master data also typically defines a process flow, or linkage, between each of the individual manufacturing operations. During execution of the system, the system controls and tracks each of the operations in the overall process.

The manufacturing process master data and routing definitions are, in a typical case, defined by a process designer or engineer. The master data and routing definitions typically define each of the operations of the manufacturing process in detail, and how each of the operations relates to other operations. The manufacturing master data and routing definitions are generally defined up front, before the manufacturing process is ever run, and are generally not changed very frequently. In other words, the master data and routing definitions are not intended to be changed on a day-to-day basis, but rather are set up at the beginning to achieve an efficiently operating manufacturing entity.

SUMMARY

This document describes a computer-implemented method of defining and using marker points within a modeled manufacturing process routing that includes multiple sequenced operations. The method includes receiving user input that defines one or more marker points within the modeled manufacturing process routing and between sequential ones of the operations. The one or more marker points each define a user-defined point within a manufacturing process and include one of multiple defined types that each define a different use to be made by the marker point. The method also includes detecting if any marker points of a specified one of the defined types have been defined in the manufacturing process routing while operating a computing process that uses the modeled manufacturing process routing and that is configured to detect and use marker points of the specified one of the defined types. If a marker point having the specified one of the defined types is detected, a predefined computing function is executed that uses the detected marker point.

In various implementations, the method may have one or more of the following features. One of the multiple defined marker point types may be a planning type. In this case, the computing process may detect marker points have the planning type, and may use the detected marker points as boundary points for defined groups of the multiple sequenced operations. In addition, the computing process may aggregate the multiple sequenced operations included in a defined group into a single operation to be used in a rough-cut manufacturing planning process. Also, the method may also include performing a manufacturing planning process that performs a manufacturing planning function using the aggregated operations.

Additionally or alternatively, one of the multiple defined types of marker points may be an execution type for use in connection with executing the manufacturing process. In this case, the computing process may detect marker points that have the execution type, and may use the detected marker points as boundary points for defined groups of the multiple sequenced operations. In addition, the computing process may aggregate the multiple sequenced operations included in a defined group into a single operation that corresponds with a defined organization that is responsible for executing the manufacturing operations of the defined group. Alternatively, the computing process may perform a reporting function when execution of a manufacturing order reaches a milestone corresponding to a point in the manufacturing process corresponding to the location of the marker point. The reporting function may include creating an electronic report of actual production quantities at the point in the manufacturing process that corresponds with the detected marking point.

In another aspect, computer program products are provided that contain executable instructions that when executed perform the above-described methods. In yet another aspect, computing systems are provided that are capable of performing the above-described methods.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4E shows details of the planning process part of the FIG. 4D method.

Like reference symbols in the various drawings indicate like elements.

DETAILED DESCRIPTION

Figure 1A:
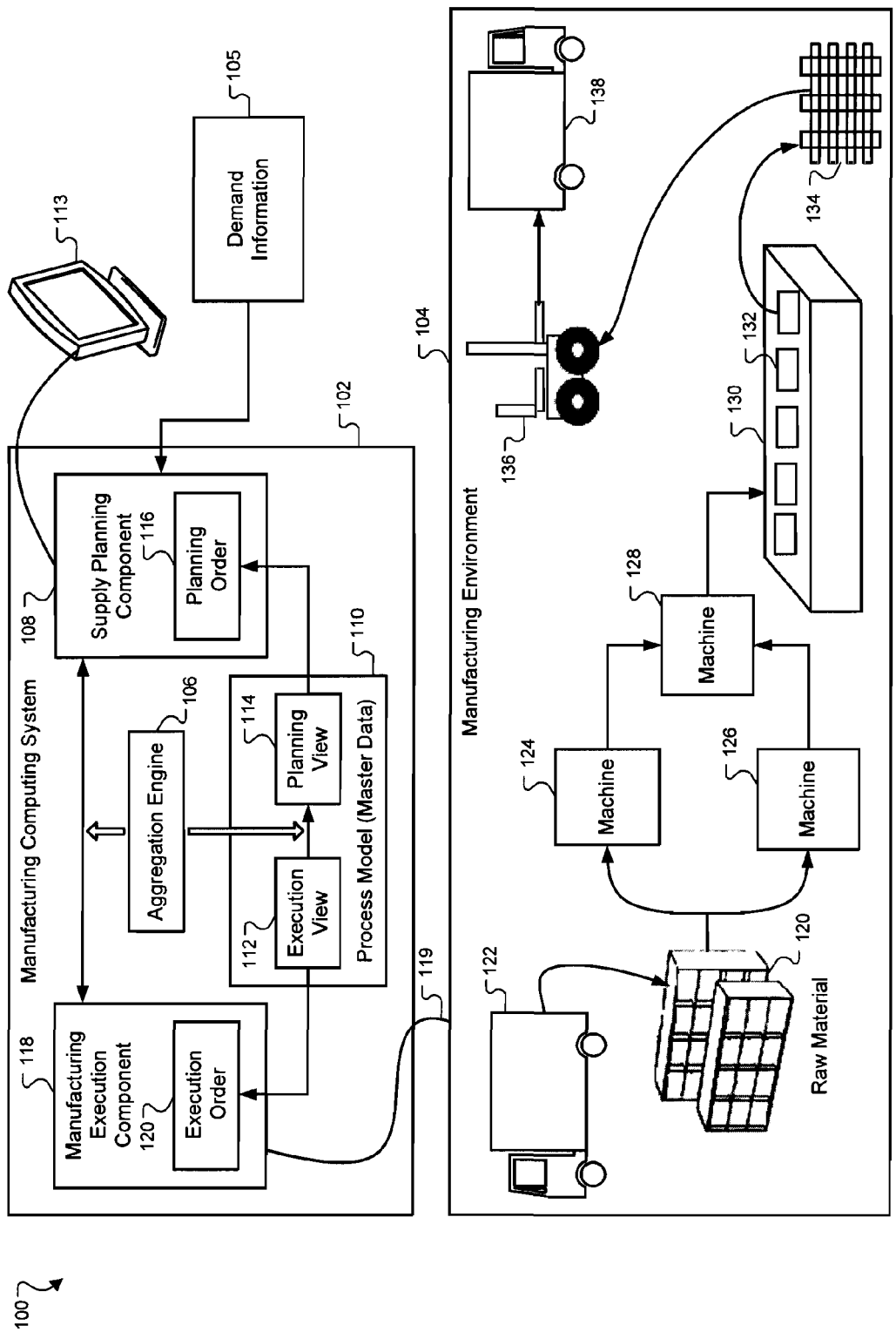
FIG. 1A is a block diagram of an exemplary manufacturing entity in which a manufacturing planning and execution computing system is used.

FIG. 1 shows an exemplary manufacturing or production entity 100 that includes a manufacturing planning and execution computing system 102 and a manufacturing environment 104, which may be, for example, a manufacturing shop floor. The manufacturing entity 100 may be any type of facility or manufacturing plant—or multiple facilities or plants under control of a distributed computing system—that manufactures any type of product and supplies product to customers.

The manufacturing planning and execution computing system 102 has a supply planning component 108 and a manufacturing execution component 118. The supply planning component 108, which also may be referred to as a manufacturing planning component, is a tool that a user may employ to plan how the manufacturing environment 104 can be operated to achieve a supply of end products that meets a specified demand. The planning component 108 receives, as shown in FIG. 1A, demand information 105, which may, for example, be in the form of a customer order that the manufacturing entity 100 supply a specified number of product within a specified timeframe, or the demand information be internally generated by the supplier, or manufacturer based on a forecast.

The planning component 108 produces planning production orders 116, which may be used in the generation of an execution order 120, which is used by the execution component 118 in executing the manufacturing process to meet the demand input. A user station 113 is shown in FIG. 1A to illustrate that a planning user may interact with the manufacturing computing system 102 to perform supply planning functions, described in more detail later.

The manufacturing execution component 118 is the "execution" portion of the manufacturing planning and execution system 102. The execution component 118 operates to control and track the execution of the manufacturing process carried out by the manufacturing environment 104 in accordance with execution orders 120. As such, FIG. 1A shows that there is an interface 119 between the manufacturing execution module 118 and the manufacturing environment 104, which interface 119 serves to integrate the computing system 102 with the manufacturing environment 104, or shop floor. For example, the interface 119 allows the computing system 102 to provide instructions that control when and where materials and resources will be used in the manufacturing environment 104, as well as the ability of the computing system 102 to receive input from the manufacturing environment 104, for example, confirming that a certain manufacturing operation has been completed.

The manufacturing planning and execution computing system 102 includes predefined manufacturing process master data, including routing definitions, shown in FIG. 1A as stored in repository 110. In particular, there are two levels of defined master data stored in master data repository, execution-level (or "execution view") master data 112 and planning-level (or "planning view" master data 114. The execution-level manufacturing process master data are, in a typical case, defined by a process designer or engineer. The execution-level master data typically define each of the operations of the manufacturing process in detail, and how each of the operations relates to other operations. The execution-level manufacturing master data and are generally defined up front, before the manufacturing process is ever run, and are generally not changed very frequently. In some cases, however, the master data may be changed more frequently, and even daily.

The planning-level master data 114 is generated from the execution-level master data 112, using grouping and aggregation methods that will be described in more detail later. An aggregation engine 106 included in the manufacturing computing system 102 includes aggregation rules for generating the planning-level master data 114 from the execution-level master data 112. The supply planning module 108 uses the planning-level, or "planning view," manufacturing process master data stored in repository 110 in the planning operations that the supply planning component 108 performs. The planning-level master data may also be referred to as a planning process model, or a "rough-cut model."

Generally, many manufacturing operations for execution are defined in the execution-level master data to make up the overall manufacturing process. The planning component 108, instead of using the planning view master data that includes all of the defined execution operations, use the planning-level master data during the planning process. For example, a manufacturing process of twenty defined execution operations may be aggregated into three planning, or "rough-cut," operations of, for example, six execution operations for a first planning operation, eight execution operations for a second planning operation, and six execution operations for a third and final planning operation. By using this aggregation functionality to create separate planning-level master data to use in the planning process, constraints arising from any of the execution operations may be accounted for in the planning process (or ignored if the details are not needed), but the level of granularity will be appropriate.

In addition, the manufacturing computing system 102 may also allow a user to select the level of granularity desired in the planning process by selecting which of the execution operations will be aggregated into a planning, or rough-cut, operation. The user may do this by putting "markers" in the overall process flow of execution operations, and the markers will serve, in addition to the beginning and end points of the overall process flow, as beginning and end points of the execution operations that will be aggregated into a single planning, or rough-cut, operation. For example, for a routing that has 20 execution operations, setting a marker between execution operations six and seven and another marker between execution operations fourteen and fifteen will yield three planning operations of, respectively, six, eight, and six execution operations. In one implementation, a user may set the markers, and hence define the groupings of execution operations, once, and then the planning master data 114 will be created based on these groupings and stored in the master data repository 110. Then, the planning master data 114 created using those groupings will be used in the planning process for a particular demand input 105, and will have the level of granularity defined by the groupings. If more granularity is desired, the markers may be redefined to have more planning operations, and new planning master data may be created with the newly defined groupings. In addition, several groupings may be defined and master data generated for using in planning, and in addition, it may be possible in some implementations to change the grouping definitions during the planning process.

In addition, a user may select to filter selected materials and resources out of the planning process, leaving flexibility for the executors to assign these materials and resources during execution. This may be done for materials and resources that are known to not be "critical path" components and need not be considered during planning. In a further example, a user may select the accuracy for the capacity planning so that the constraints for the capacity supply and capacity requirements in planning may be relaxed based on the selection. This will be described in more detail later in the context of performing rough-cut planning.

The planning component 116 may use a predefined "rough-cut" planning data structure that is part of the planning master data 114. This rough-cut data structure defines the structure of each planning, or rough-cut, operation and defines the relationship of resource capacity requirements to the planning operation. The rough-cut data structure will be described in more detail later.

As mentioned previously, the supply planning component 108 prepares an planning-level electronic production order 116. At an appropriate point in time, the planning-level production order may be released for execution, at which time an execution-level production order 120 may be generated using the execution-level master data 112 and information defined in the planning-level production order 116. The execution order 120 will be used by the manufacturing execution component 118 and that will fulfill the demand information 105. The planning order 116, as will be explained in more detail later, will typically include a calculated time duration during which each of the aggregated planning operations, or rough-cut operations, will occur. In addition, the planning order 116 may also include a schedule of selected and non-filtered, manufacturing material requirements and resource capacity requirements, as well as scheduled times of when the material and resource capacity requirements will be needed. The planning order 116 is prepared at a level of granularity corresponding to the level of granularity planning-level master data 114 used in the planning process. Later, when the planning order 116 is released for execution, the aggregation engine 106 is used, this time in the inverse, to generate an execution order from the execution master data 112 that is consistent with scheduling included in the planning order 116.

The production environment 104 shown in FIG. 1A is a simplified example of a complete manufacturing process to produce a product from beginning to end. The process in this example includes both production (making) and logistics (moving) functions. The process begins with the delivery of raw material from a truck 122. The raw material is shown being stored in a storage area 120. From there, the raw material may be processed by one of two alternative machines 124 and 126. The output of both machines 124 and 126 feeds into another machine 128. The output of machine 128 feeds into a transport process, such as a conveyor system 130, that delivers the output products 132 of machine 128 to an output staging area where the output product 132 is loaded onto pallets 134. There may also be a packing operation to package the output products 132 before they are loaded onto pallets. A forklift 136 is then used to load pallets of finished and packaged product into a truck 138 for final delivery. It will be appreciated that the FIG. 1A example is a simplified high-level depiction of a manufacturing environment 104 for illustration purposes only, and that an actual environment may be much more complex and involve many more execution operations.

The execution component 118 performs execution and control functions on the manufacturing environment 104 according to the generated execution order 120. For example, the execution component 118 may instruct the manufacturing environment 104 to execute the operations or the sub-activities. Upon receiving the instructions, the manufacturing environment 104 may execute the received instructions and report status of the production floor 104 to the execution component 118.

The computing system 102 may generate various different user interface views to assist both the planning component 108 and the execution component 118. The system 102 may generate a planning board and various execution information screens, for example. The planning board may provide a visual display of the process flow using planning operations, as defined by markers selected by a user, as separate blocks of the overall process flow. The planning board may be used during a planning function, and the execution screens may be used in an execution function.

Figure 1B:
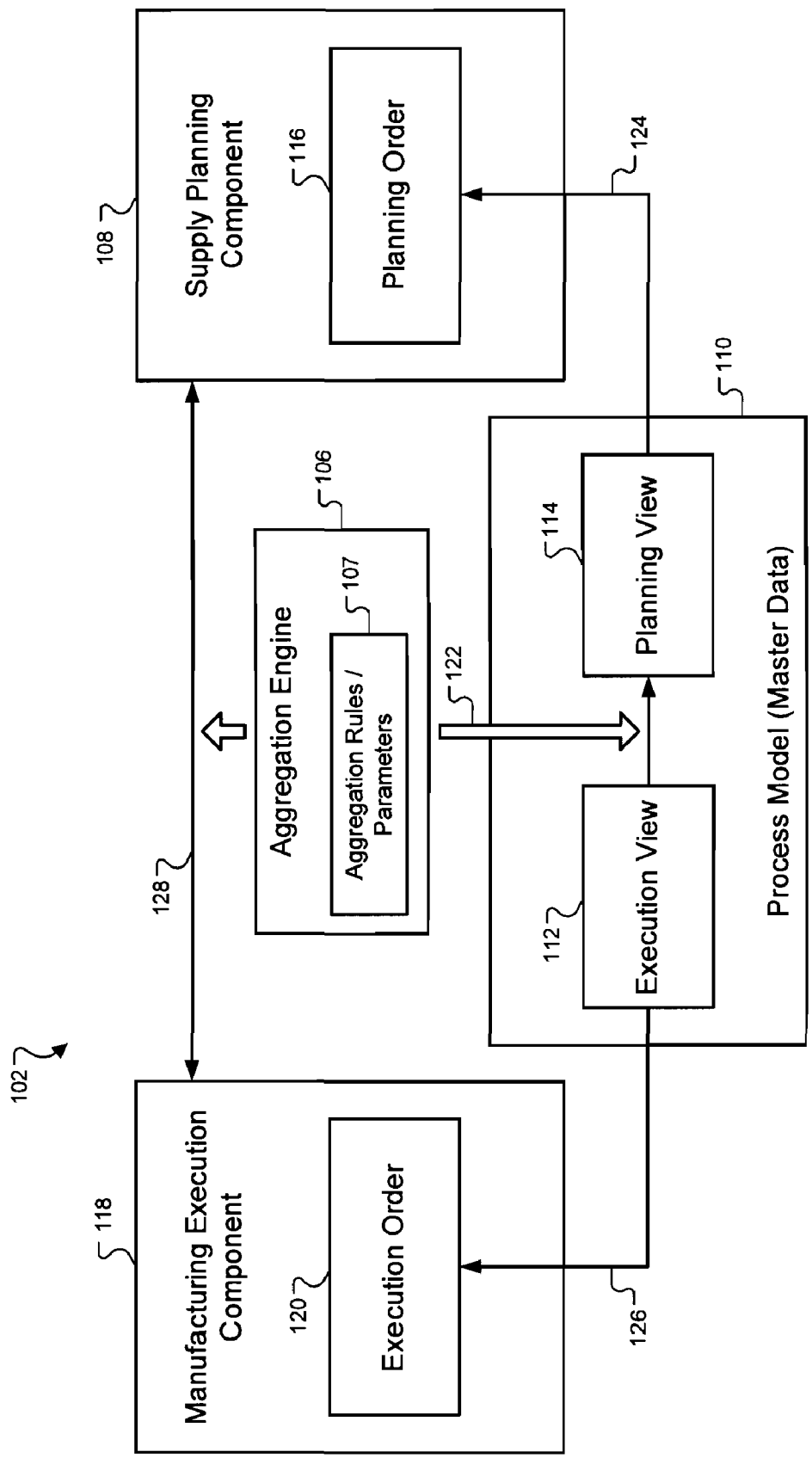
FIGS. 1B-1D are block diagrams of three different perspectives of an example of the manufacturing planning computing module shown in FIG. 1A, shown in more detail.

FIG. 1B shows a more detailed view of an example manufacturing computing system 102 shown in FIG. 1A. Many of the components shown in FIG. 1B have already been described in connection with FIG. 1A. The following discussion of FIG. 1B will address the general operation of the system 102 in the context of planning functions. First, as shown in FIG. 1B, the aggregation engine 106 includes aggregation rules and parameters 107. The aggregation rules and parameters 107 may be predefined rules that enable a translation between execution-level information and planning-level information, and vice-versa. Generally, the rules and parameters 107 may define how several execution operations may be aggregated into a single planning operation, and may define relationships, including timing relationships, between various defined planning operations. In addition, the aggregation rules and parameters 107 may be used in an inverse manner in the generation of an execution order 120 from a planning order 116.

As shown by arrow 122, the aggregation engine 106 is used in the generation of the planning-level master data 114 from the execution-level master data 112. Then, as shown by arrow 24, the planning-level master data 114 is used to produce the planning order 116. The execution-level master data 112 and the planning order 116 are both used to generate the execution order 120, as shown by arrows 126 and 128. In one implementation, the execution order 120 is generated initially based on the execution-level master data 112, and then the planning order 116 is used for the scheduling information it contains. The aggregation engine 106 is used in this process to ensure that the detailed scheduling that occurs as part of generating the execution order 120 is consistent with the planning order 116 and its defined level of granularity and how the groupings are defined.

Although it is contemplated that in the typical scenario the execution order 120 is generated from the planning order 116, it is also possible that the planning order 116 may be generated from the execution order 120. As such, arrow 128 between the manufacturing execution component 118 and the supply planning component 108 is shown as a two-way arrow. In addition, in some cases the execution order 120 may get revised during execution, for example, because the manufacturing process may be ahead of or behind schedule. In such a case, the planning order 116 may be update so that additional planning processes that take into account the information set forth in the planning order 116 may take the changed circumstances into account. Here again, when the planning order 116 is updated by a revised execution order 118, the aggregation engine 106 may be involved in the process to make the necessary translations.

Figure 1C:
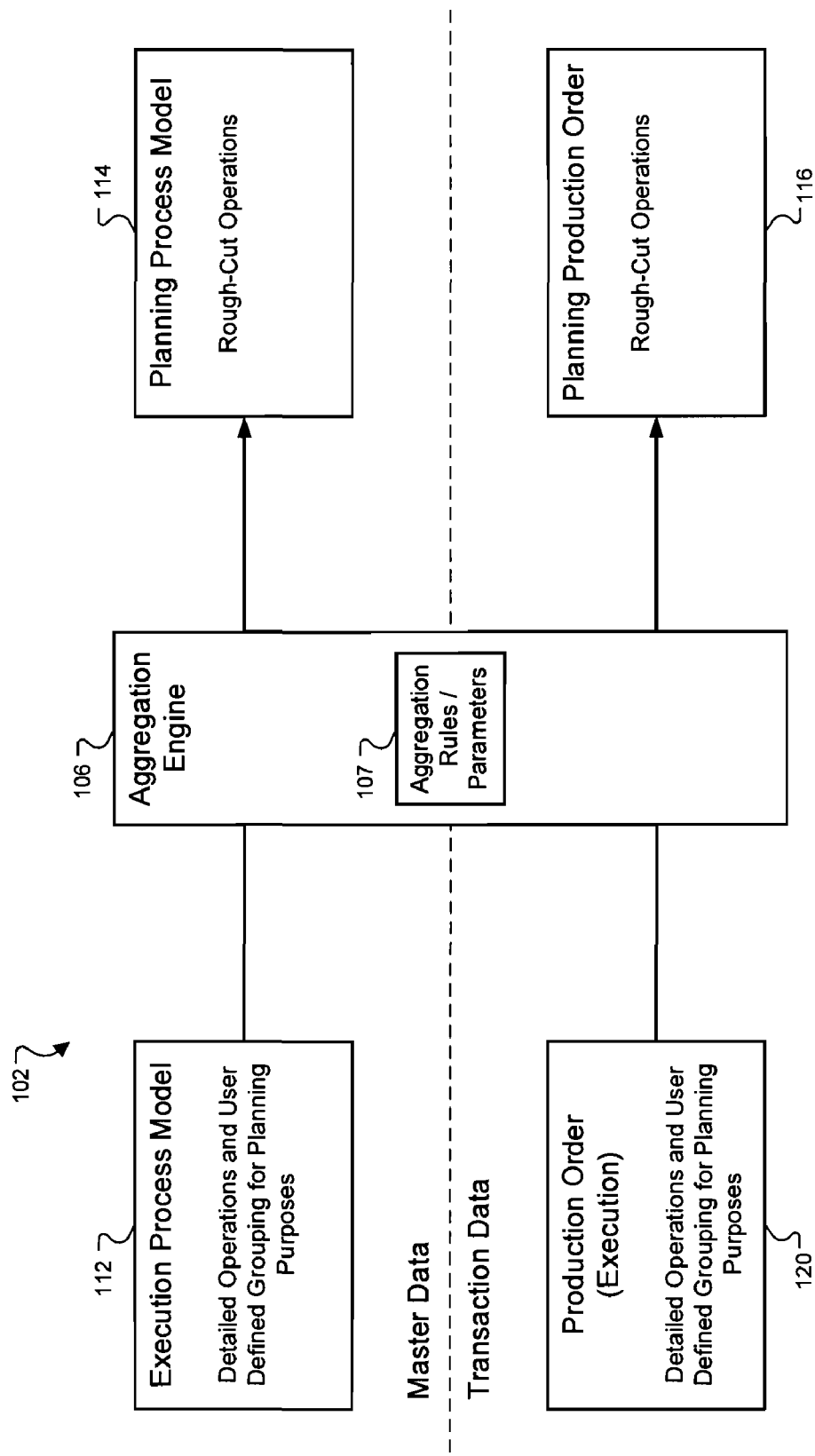

Referring now to FIG. 1C, another depiction of the system 102 shown in FIGS. 1A and 1B is shown to illustrate another point. In particular, FIG. 1C illustrates that the aggregation engine 106 is used both in generating planning-level master data 114 from execution-level master data 112 (that is, a master data layer), and in generating planning production orders 116 (that is, at a transactional data layer), for example from execution production orders 120 if an execution production order 120 has already been generated (which is not the case in many scenarios, and so instead the planning production order 116 would simply be generated as described previously).

As shown in FIG. 1C, the execution-level master data 112 may also be referred to as an execution process model, and includes definitions for the detailed execution-level operations. In addition, the execution-level master data 112 may also include user-defined groupings, for example of one or more execution-level operations or of execution-level resources. The planning process model 114 includes definitions for planning operations, which may also be referred to as rough-cut operations. This may be the data structure for the rough-cut operation described previously. In addition, the execution-level production order 120 may similarly include information about the detailed operations, but in this case, it will be information about the operations for a specific order. Again, the execution-level production order 120 may include user-defined groupings for planning purposes, which may not be the case in all scenarios. The planning production order 116 also includes information about rough-cut operations, although in this case it will be the rough-cut operations for a particular order.

Figure 1D:
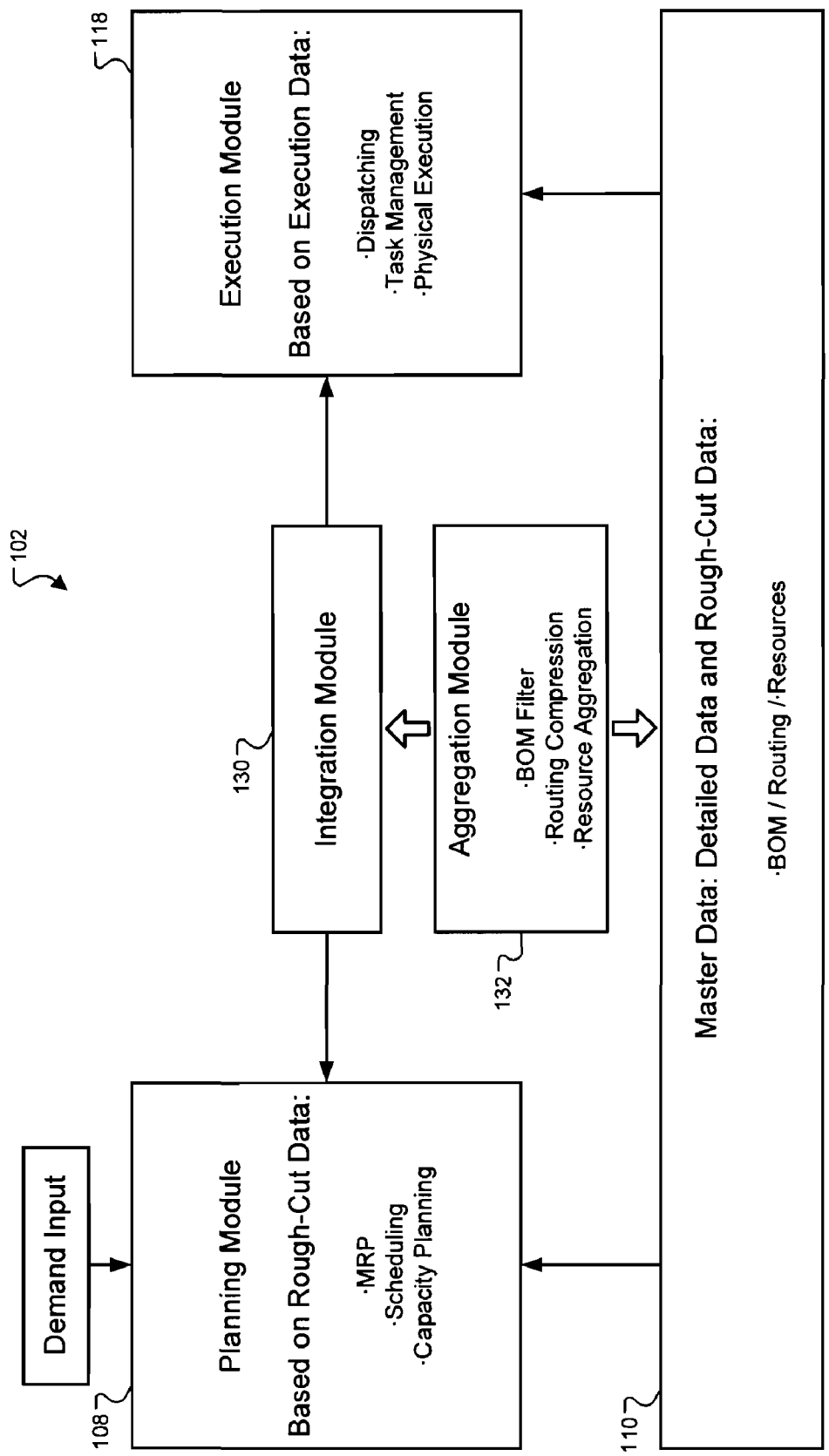

FIG. 1D shown another perspective of the system 102 shown in FIGS. 1A-D. Here it is shown that the planning component, or module, 108 includes various planning functionality to perform manufacturing resource planning (MRP), scheduling, and capacity planning, for example. These functions will be described in more detail later. In addition, the functions are performed using rough-cut data as generated using the rough-cut process model, or planning master data, stored in master data repository 110. FIG. 1D also shows that the execution component, or module, 118 includes various execution functionality, including for example dispatching functions (for example, to dispatch materials or resources to be used in the manufacturing process), task management, and physical execution. These functions are performed using detailed, or execution-level, data.

FIG. 1D shows that the system 102 has an integration module 130, which integrates the execution module 118 and the planning module 108. As shown, an aggregation module 132 works in concert with the integration module 130. As will be described in more detail later, the aggregation module 132 includes a bill of material filter to filter material requirements that are not planning relevant, routing compression functionality to aggregate grouped execution-level operations into a few number of planning-level operations, and resource aggregation functionality to aggregate two or more execution-level resources into one virtual planning-level resource.

Figure 2:
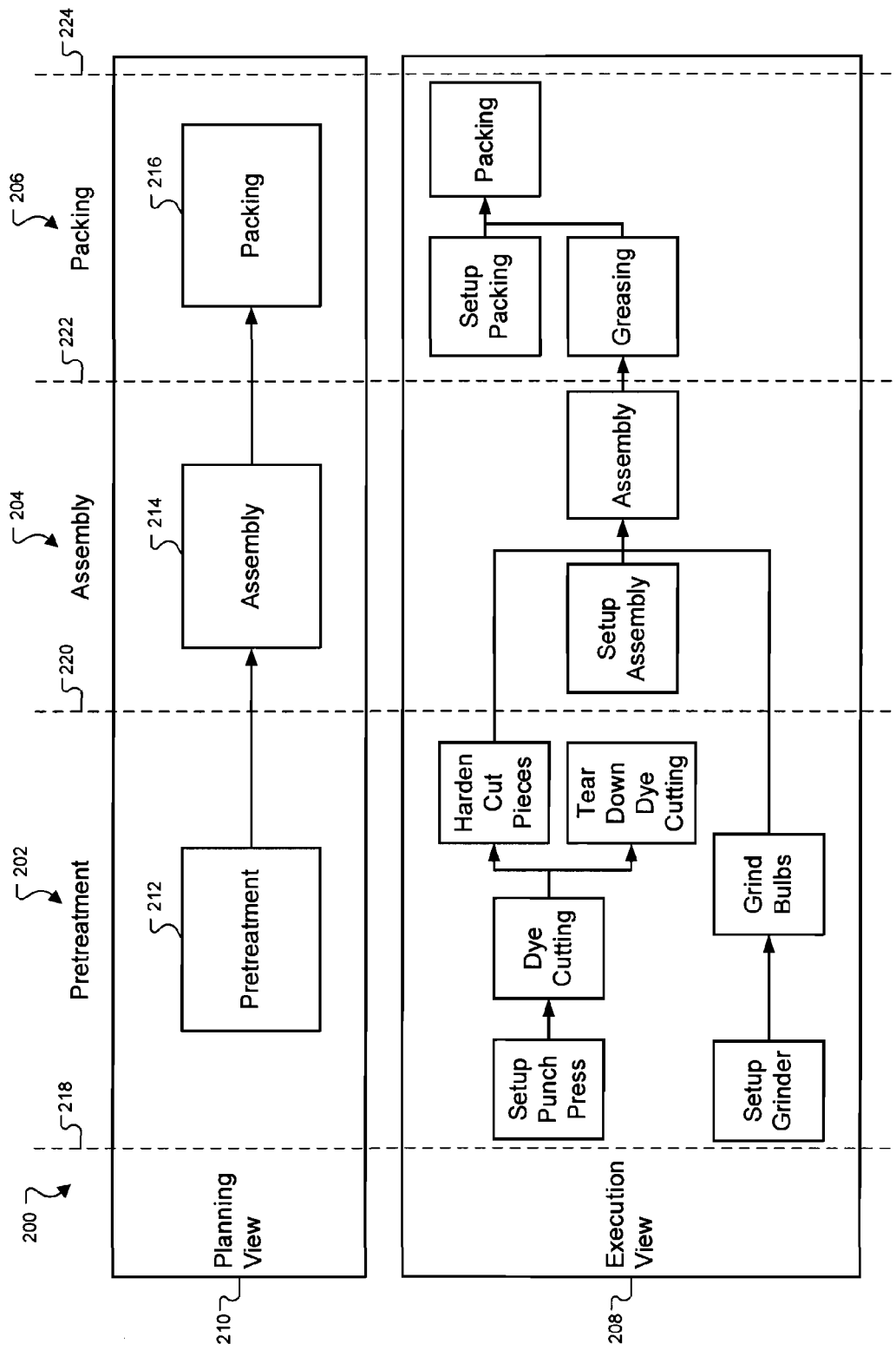
FIG. 2 is a diagram that illustrates execution view and planning view versions of a manufacturing process master data.

FIG. 2 is a diagram that illustrates the different levels of granularity in a planning view 210 (that is, planning-level master data 114, as shown in FIG. 1A) versus an execution view 208 (that is, execution-level master data 112). In the planning view 210, the production floor operations may be represented as three production stages, a pretreatment stage 212, an assembly stage 214, and a packing stage 216, which correspond to the phases of the manufacturing process of pretreatment 202, assembly 204 and packing 206. As such, the supply planning module 108 may generate a planning production order 116 (see FIG. 1A) that includes scheduling and time duration information for the three planning-level operations 212, 214 and 216. Each of the three planning operations 212, 214 and 216 is made up of a defined group of execution-level operations. For example, the pretreatment planning operation 212 is an aggregation of six execution-level operations, namely, setup punch press, dye cutting, harden cut pieces, tear down dye cutting, setup grinder and grind bulbs. The assembly planning-level operation 214 is an aggregation of two execution-level operations, namely, setup assembly and assembly. The packing planning-level operation 216 is an aggregation of three execution-level operations, namely, setup packing, greasing, and packing.

Not all of the information included in the execution view 208 may be relevant to planning. For example, a planning user may only be interested in scheduling a high level of granularity of the three main planning-level operations including pretreatment 202, assembly 204 and packing 206. The planning user may be not be interested in scheduling at a detailed level of activities such as setup activities, tear down activities, or the like. Accordingly, the planning user may define the rough-cut operations shown in the planning view 210 by placing user-selected markers in the execution routing. In this example, the user has defined three planning operations of interest, a pretreatment operation 212, an assembly operation 214, and a packing operation 216. The planning user may then define the planning operations 212, 214, and 216 by placing user-selected markers to group execution operations in the execution view 208. FIG. 2 also shows planning operation borders 218, 220, 222, 224. Users may place markers in the execution routing at the position of the borders 220 and 222 to define the planning operations 212, 214, 216. For example, the pretreatment operation 212 is defined by the border 218 and the border 220 and may have characteristics approximated using the characteristics of the activities and operations include between the borders 218 and 220 in the execution view 208. The detail of the placement of the user-selected markers will be discussed below.

Figure 3:
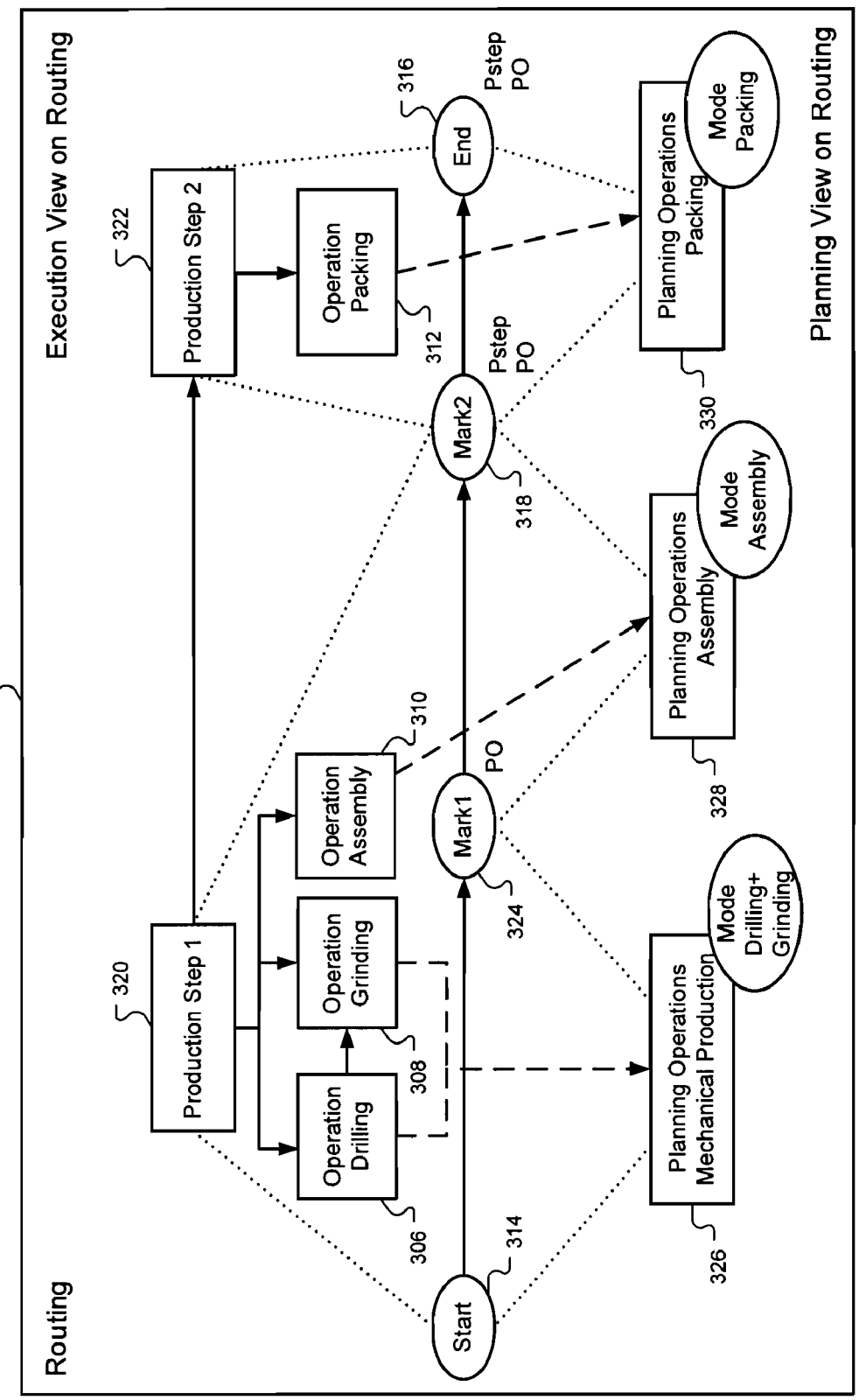
FIG. 3 is a block diagram of an exemplary routing that includes production steps and planning operations that may be defined by a set of markers.

Referring to FIG. 3, there is another conceptual depiction of a routing 300 that illustrates the difference between the detailed execution-level operations of the execution view of the routing, and the less granular planning-level operations of the planning view of the routing. In addition, FIG. 3 shows the use of markers, and specifically two different types of markers, that define different groupings. One set of markers are "planning operation" (PO) markers, and these define the groupings for the planning-level, or rough-cut operations used for planning purposes. The other set of markers are "production step" (PStep) markers, and these define groupings that are used in functions that are unrelated to planning, such as in execution to define the points in time where confirmations are made as to when a confirmation if completion is made at an intermediate point in the execution of an execution production order.

The top half of FIG. 3 shows the execution view of the routing 300, and includes all of the detailed execution-level operations of the routing 300 and the interrelationships between the execution-level operations as defined in the routing 300. Also shown on the top half of FIG. 3 are the defined production steps 320 and 322, which are groupings of the execution-level operations as defined by the PStep markers 318 and 316. The bottom half of FIG. 3 shows the defined planning-level, or rough-cut, operations, which are aggregations of the execution-level operations as defined by the PO (planning operation) markers 324, 318 and 316, in connection with start marker 314.

In the depicted example, the execution view of the routing 300 includes an operation drilling 306, an operation grinding 308, an operation assembly 310, and an operation packing 310. In some embodiments, a routing may be defined by a start mark 314 and an end mark 316, which defines the borders of planning activities and production order.

In some embodiments, a grouping element, called a marker, for planning and execution purposes may be defined to flexibly divide a routing into several production steps and planning activities. A user may define a marker to serve many different functions. In one example, a user may define a planning mark that serves as a border of a planning operation. In another example, a user may define an execution marker to define the border of a production step. In a further example, a user may define a marker as a reporting point to indicate a time for counting actual production quantities in the production process. If there is no marker in a routing, then the whole routing may be defined as a single production step or a single planning operation. A user may define and understand, through the use of the markers, the main material flow and main sequence of a routing.

In the example in FIG. 3, a default may be predefined with the start mark 314 and the end marker 316 originally set to group all defined execution operations into a single step. A user may place a marker 318 in the routing 300 to define a first production step 320 and a second production step 322. As shown in FIG. 3, the production step 320 may include the operation 306, the operation 308 and the operation 310, which are bracketed by the start marker 314 and the marker 318. The production step 322 may include the operation 312, which is bracketed by the marker 318 and the end marker 316.

The routing 300 also includes a user-selected marker 324 that together with the start marker 314, the marker 318, and the end marker 316 define three planning-level, or rough-cut, operations 326, 328, 330. The planning operation 326 may include the operation 306 and the operation 308, which are bracketed by the start marker 314 and the marker 324. The planning operation 328 may include the operation 310, which is bracketed by the marker 324 and the marker 318. The planning operation 330 may include the operation 312, which is bracketed by the start marker 318 and the end marker 316.

Referring now to FIGS. 4A-4E, there are several flowcharts that illustrate operation of the system of FIGS. 1A-D in performing manufacturing planning. Starting with FIG. 4A, there is shown a flowchart of major steps in a computer-implemented method for first, generating planning-level master data and, second, using the generated planning-level master data in performing a planning process. The method shown in FIG. 4A may be performed, for example, by the supply planning component 108 of the FIG. 1A system 102.

First, in step 402, user definitions of groupings of execution-level entities are received. The execution-level entities may be, for example, execution-level operations, such as the operations illustrated in the execution view 208 of FIG. 2. This may be done, for example, by setting planning operation markers, as illustrated in FIG. 3. Additionally or alternatively, the execution-level entities may be execution-level resources, such as human resources or machines and other equipment to perform manufacturing functions. In this case, the resources included in the grouping may be similar resources that may be considered as a single resource for planning purposes. The user definitions may be entered, for example, using the client device 113 shown in FIG. 1A.

Next, in step 404, the grouped execution entities (groups of operations and groups of resources) are aggregated as part of a process of generating the planning master data that later will be used in performing a manufacturing planning process for a particular demand input. The aggregation function of step 404 may be performed, for example, using the aggregation engine 106 shown in FIGS. 1A and 1B, using the aggregation rules and parameters 107 that have been pre-configured for the aggregation engine 106. Steps 402 and 404, together, generate the planning-level master data from the execution-level master data.

The configuration steps of 402 and 404 may be performed one time for several planning processes. In other words, the groupings may be defined and planning-level master data generated once, and that same planning-level master data may be used in planning processes for different manufacturing orders. In addition, multiple sets of planning-level master data may be generated for different granularities of users, and then the planning user performing a particular planning task may select one of the granularity levels to use in the planning process.

The planning process of steps 406 and 408 may be performed, for example, by the supply planning component 108 of the FIG. 1A system 102. In step 406, the planning process begins with generating a planning order for a particular demand input that may, for example, identify the product to be manufactured, a quantity to be manufactured, and a requested delivery or completion date. The planning order is generated using the planning-level master data. This function may be performed, in one implementation, without user involvement, or in other words, the planning order may be generated automatically. This step 406 may produce, for example, time duration measures for each of the defined planning-level, or rough-cut, operations and time relationships between the rough-cut operations. In addition, the step 406 may produce capacity requirements for defined planning-level resources, which may include capacity requirements for defined groups of resources.

Next, in step 408, the generating planning order is scheduled. This step may be performed either automatically or with user involvement. In one implementation, the generated rough-cut operations, including calculated intra-operation time durations and inter-operation timing relationships, are scheduled in a unified planning calendar that includes already scheduled operations for other demand inputs. In addition, the resource capacity requirements, in one implementation, are scheduled in a calendar for the particular planning-level resource.

After step 408, the planning order may be released in step 410. This generally occurs just before the planning order needs to be executed. It may be desirable to not release the planning order earlier than needed because the planning order may be revised in view of later orders that are planned and scheduled. Once the planning order is released in step 410, an execution order may be generated as briefly described previously, and as will be described in more detail later.

Figure 4A:
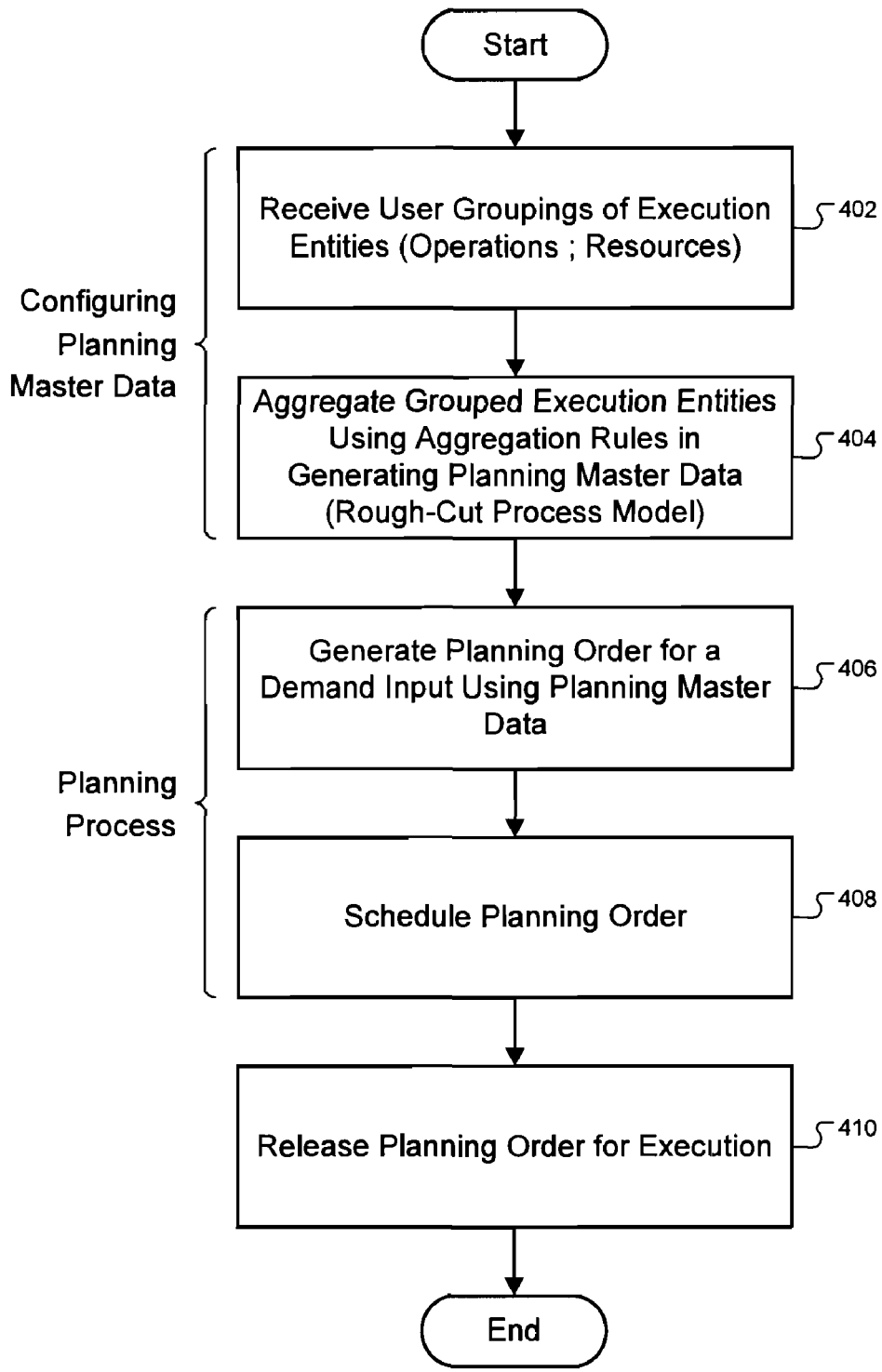
FIG. 4A is a flowchart showing a computer-implemented method for grouping and aggregating execution entities for planning purposes.
Figure 4B:
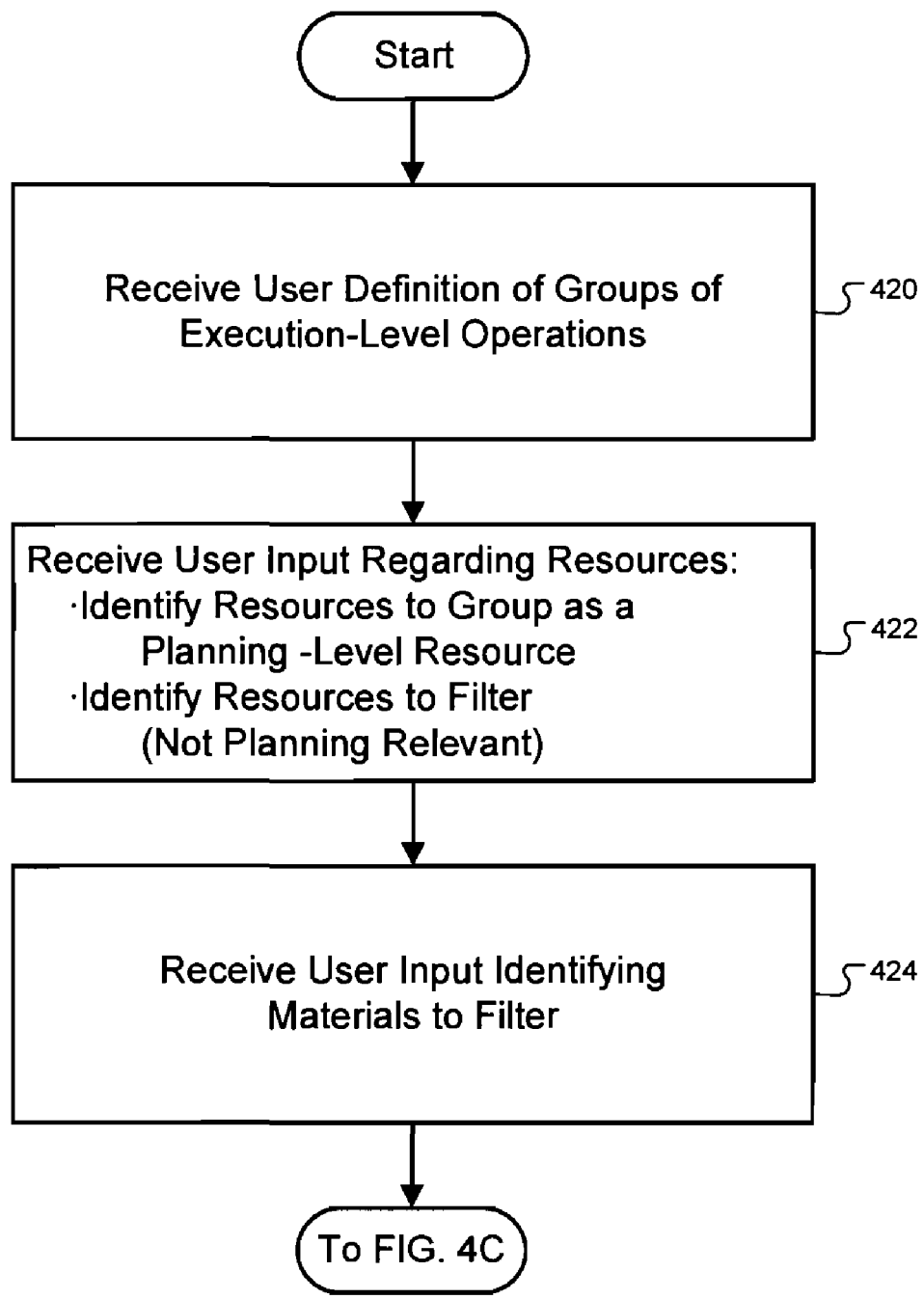
FIGS. 4B-4C is a flowchart showing a computer-implemented method for generating planning master data from execution master data.
Figure 4C:
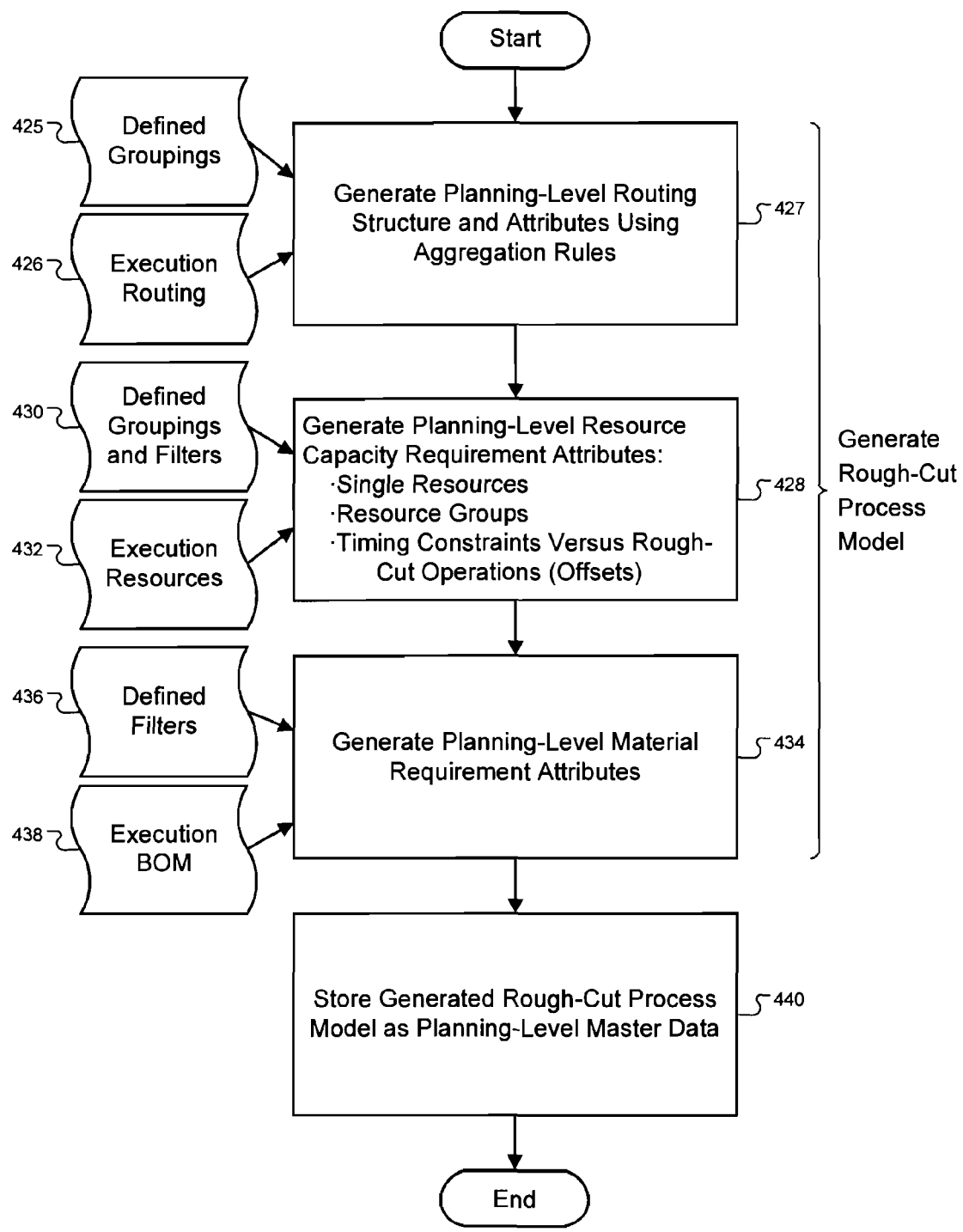

Referring now to FIGS. 4B-4C, there is shown a more detailed flowchart of the computer-implemented method for generating the planning-level master data, which may also be called a rough-cut process model. In step 420, user definitions of groupings of execution-level operations are received. The execution-level operation may be similar to those illustrated in the execution view 208 of FIG. 2. This may be done, for example, by setting planning operation markers, as illustrated in FIG. 3. Next, in step 422, user input is received regarding resources. In particular, the user input identifies execution-level resources, such as human resources or machines and other equipment, that are to be grouped and aggregated for planning purposes. In addition, the user may identify resources to be filtered in the planning process because they may be deemed to not be relevant for planning purposes. In step 424, user input is received identifying materials to be filtered during the planning process, again because they may be deemed to not be relevant for planning purposes. In some cases, the filtering may be a default value, or may be automatically determined without user involvement.

The method continues on FIG. 4C where the generation of the rough-cut process model is shown. Starting in step 427, a planning-level routing structure and attributes are generated using aggregation rules and parameters. Step 427 may be performed, for example, using the aggregation engine 106 shown in FIG. 1B. As shown in FIG. 4C, the generation of the rough-cut process model in step 427 is done using the execution-level operations 525 defined in step 420 and the execution routing 426 included in the execution-level master data (for example, the execution view 112 of the FIG. 1A system 102).

Next, in step 428, planning-level resource capacity requirement attributes are generated. Capacity requirements are determined for any single execution resources (not grouped) that were not filtered in step 422. Capacity requirements are also calculated for multiple execution resources that are grouped as a planning resource. As such, the step 428 uses the defined groupings and filters 430 that were defined in step 422. In addition, the step 428 uses the execution resources 432 as defined in the execution-level master data. Finally in step 428 the timing constraints are determined versus the rough-cut operations in which the planning resources (whether single execution resources or multiple execution resources grouped together as a planning resource).

Referring now to step 434, planning-level material requirement attributes are generated, using the defined material filters 436 defined in step 424 and the execution bill of materials (BOM) 438. At step 440, the rough-cut process model, which includes the routing structure and attributes generated in steps 424, 428 and 434, is stored in a master data repository so that the model may be used in performing a manufacturing planning function. For example, the rough-cut planning model may be stored in the master data repository 110 of the FIG. 1B system 102.

Figure 4D:
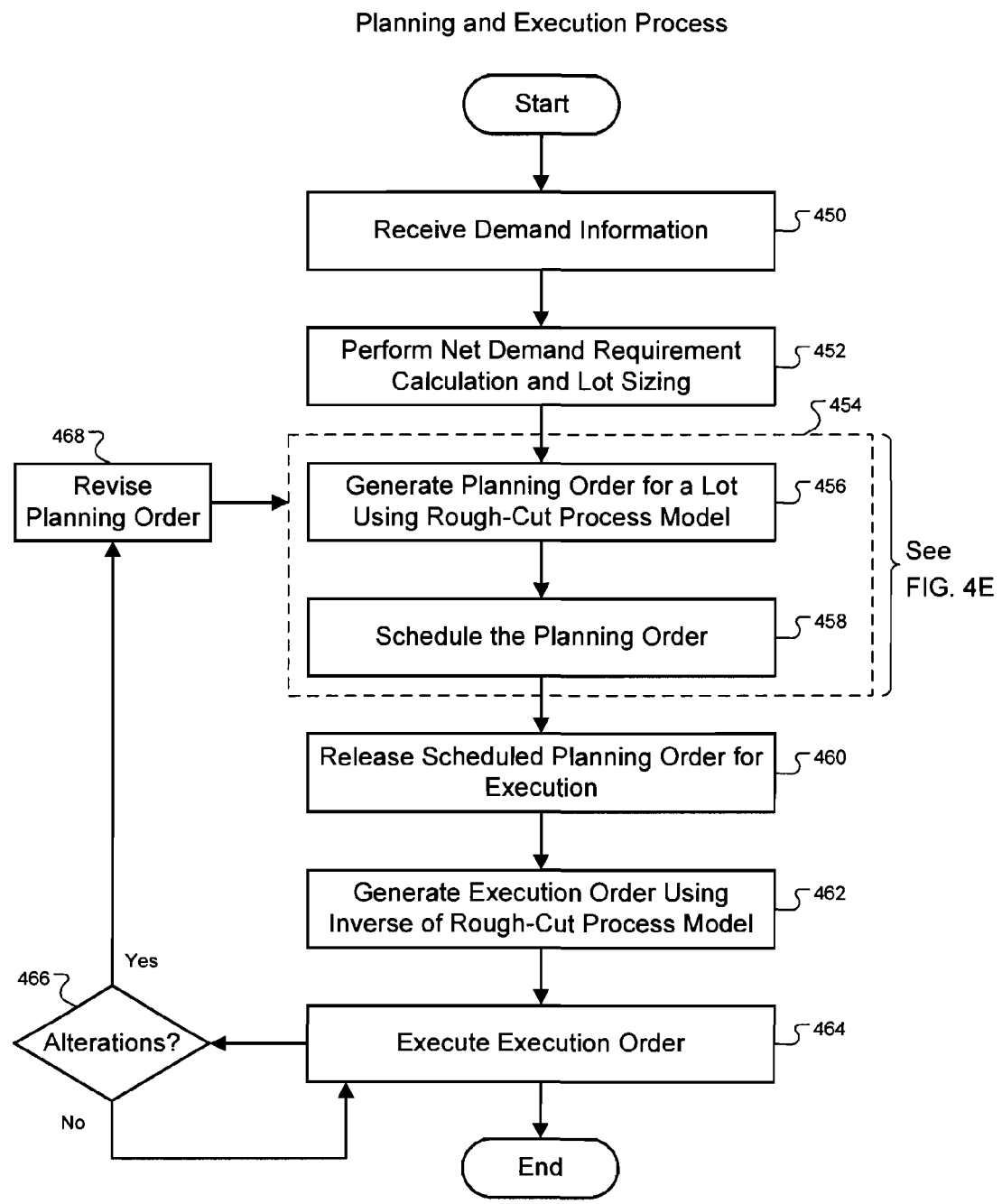
FIG. 4D is a flowchart of a computer-implemented method for planning and executing a manufacturing process.

Referring now to FIG. 4D, there is shown a flowchart that illustrates a computer-implemented method for planning and executing a manufacturing order. First, in step 450, the method begins with receipt of demand information. The demand information may include, for example, a customer order and forecasted information. The demand information may include, for example, an identification of the products to be produced, the quantity to be produced, and a requested date for delivery.

Before starting the planning process, in step 452 there is performed a process for determining, firstly, a net demand requirement, and secondly, manufacturing lots. Net demand may be determined because, for example, there may already be goods in inventory or in process of being manufactured that may be used to satisfy the demand information received in step 450. The net demand requirement may then be divided into multiple manufacturing lots using a lot-sizing process. The lot then becomes the subject of a production order in later steps of the process.

Figure 4E:
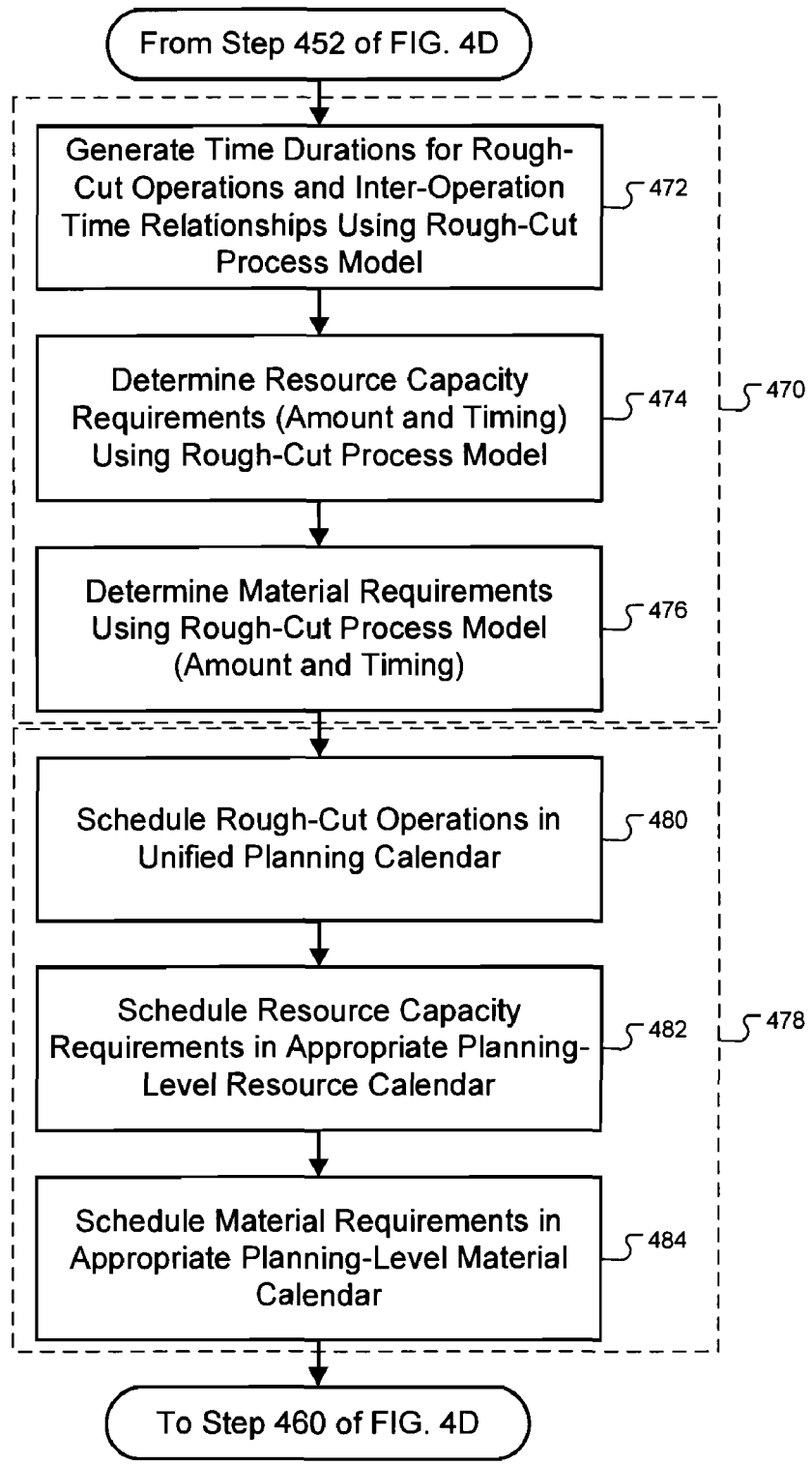
FIG. 4E is a flowchart with further details of an example method used in the method of FIG. 4D, where

Next, the method proceeds to step 454 where a planning process on the lot is performed. The details of step 454 are shown in FIG. 4E. For present purposes as shown in FIG. 4D, the planning process 454 includes a step 456 of generating a planning order for the lot using the rough-cut planning model. Then at step 458 the planning order is scheduled. At some point after the planning process is complete, the scheduled planning order is released for execution in step 460. After the scheduled planning order is released, an execution production order is generated at step 462. This may be done, in one implementation, by using the execution-level master data, and performing scheduling of execution operations and resource and material requirements that are consistent with the scheduling contained in the planning order. In addition, an inverse of the rough-cut process model may be used in the process of translating the scheduling parameters of the planning order to the scheduling for the execution order. The execution order is executed at step 464.

FIG. 4D also illustrates that the execution order may be altered at some point after the planning order has been released. In this case, it may be detected if there are alternations at step 466. If so, then a process may be initiated so that at step 468 the planning order may be revised. This may be desirable because even released planning orders constrain times in which future manufacturing lot operations may be scheduled.

Referring now to FIG. 4E, the details of the planning process 454 of FIG. 4D are shown. The first major step 470 involves, generally, the generation of the rough-cut operations and resource capacity and material requirements. The main variable in these calculations will be the quantity of product to be produced for the lot. Step 470 begins with sub-step 472 where time durations are generated, or calculated, for each of the rough-cut operations, and in addition, inter-operation time relationships are determined. These time measures are calculated using the rough-cut process model.

Next, in step 474, planning-level resource capacity requirements are calculated. This will be done for all execution resources that are defined to not be filtered, for example, in step 422 of the FIG. 4B-4C method, and in addition, it is performed for defined groups of execution resources that are defined as a single planning resource. In this step 474, both the amount of the capacity required and the timing for when the capacity is needed is determined. Again, this is determined using the rough-cut process model. In one implementation that will be described in more detail later, the timing of the resource capacity requirement will within the time-frame within which the rough-cut operation is performed where the resource is used. In addition, defined offsets for the resource, such as may be generated in step 428 of the FIG. 4B-4C method. Details of how the offsets are defined and used will be described later.

The method shown in FIG. 4E next proceeds to the next major step 478 where scheduling of the planning order is performed. Step 478 begins with sub-step 480 where the rough-cut operations are scheduled in a unified planning calendar, as described previously in connection with step 408 of the FIG. 4A method. Next, in step 482, the resource capacity requirements are scheduled in the appropriate planning-level resource calendar. In a case where the planning resource is a single execution resource that is not filtered, the resource calendar used in planning may actually be an execution calendar for the resource. In a case where the planning resource is an aggregation of multiple execution resources, a virtual planning calendar for the planning resource may be used, and then that planning calendar may be translated to individual execution calendars when the execution order is generated. Finally and optionally, the material requirements may be scheduled in an appropriate planning-level calendar for the material. The method then proceeds to step 460 of FIG. 4D.

Figure 5:
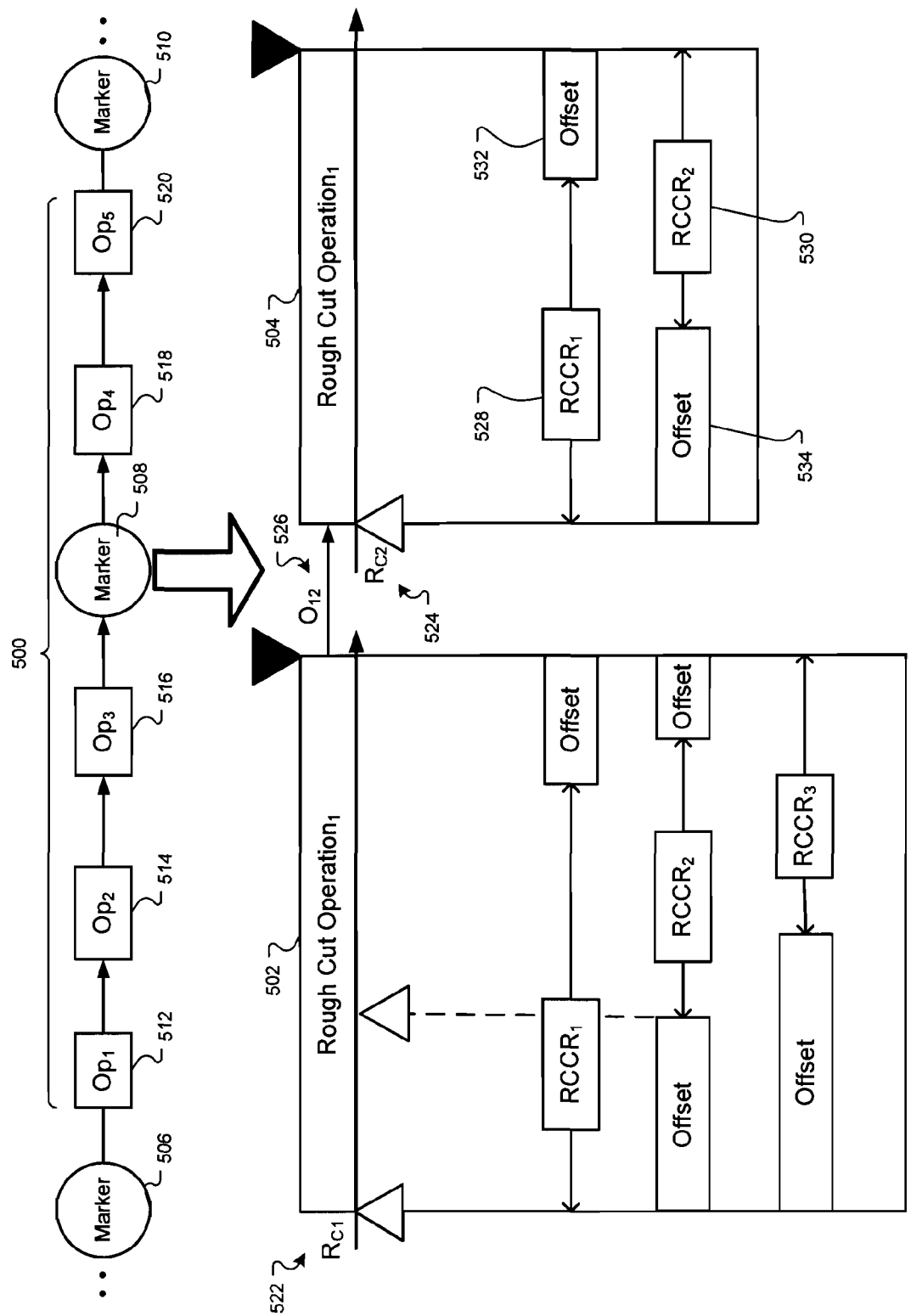
FIG. 5 is a diagram showing an example execution routing of a manufacturing process and a planning routing, including rough-cut operations, generated from the execution routing.

Referring now to FIG. 5, an exemplary operation sequence 500 in an execution routing is shown, along with two corresponding rough-cut operations. As discussed previously, a user may group execution operations into planning, or rough-cut, operations 502 and 504 by placement of a marker 508 in the master data. In this example, a user may group the consecutive operations 512, 514 and 516 into a first rough-cut operation 502 and the consecutive operations 518 and 520 into a second rough-cut operation 504. In configuring the planning-level master data, parameters may be configured to establish time duration parameters both for the duration of a particular rough-cut operations and time duration parameters for inter-operation time relationships.

As for the intra-operation time requirements, the rough-cut operation 502 has an associated capacity requirement $R_{C1}$, which may represent a quantity of intermediate products that need to be generated by the rough-cut operation to meet a demand input. This capacity requirement $R_{C1}$ impacts the time duration calculated for the rough-cut operation 522. Similarly, the second rough-cut operation 504 also has an associated capacity requirement $R_{C1}$, which may also represent a quantity of intermediate products that need to be generated by the rough-cut operation to meet a demand input.

With respect to the inter-operation time relationship, the relationship between two rough-cut operations may be such that a subsequent rough-cut operation may start before a previous rough-cut operation ends. Alternatively, as is the case in the FIG. 5 example, the second rough-cut operation 504 may occur at some time duration after the first rough-cut operation 502 is completed. In this situation, the time relationship between to the two rough-cut operations 502 and 504 may be referred to as an offset $O_{12}$ 526. In addition, there may be many ways to specify a time relationship between the two rough-cut operations 502 and 504. For example, the time relationship may be measured from the start of the first rough-cut operation 502 to the start of the second rough-cut operation 504, or from the end of the first rough-cut operation 520 to the start of the second rough-cut operation. Other time relationship end points may also be used. In the example shown in FIG. 5, the offset 526 is an end-start time relationship between the two rough-cut operations 502 and 504.

The supply planning component 108 may compute or otherwise obtain the time duration measures for an actual production lot being planned during the planning process. In one example, the inter-operation time relationship 526 may be modeled as a linear function with respect to a quantity to be produced. In another example, the inter-operation time relationship 526 may be fixed and stored in the routing information in the database 110 (FIG. 1A).

The rough-cut operation structure depicted in FIG. 5 also illustrates that resource capacity requirement that arise in operations aggregated into a rough-cut operation are associated with the rough-cut operation in which the requirements arise. In this example, the rough-cut operation 502 has three rough-cut capacity requirements (RCCR) associated with it. There may be more resource capacity requirements imposed by the execution operations that are aggregated into the rough-cut operation 502, but those resource capacity requirements may have been defined to be filtered in the process as not being planning relevant, as discussed previously. The second rough-cut operation 504 includes rough-cut capacity requirement (RCCR) 528 and another RCCR 530. As discussed previously, the planning-level master data may provide parameters for each of the rough-cut capacity requirements that are necessary to calculate the capacity requirements during a planning process for a particular production lot.

The rough-cut planning structure shown in FIG. 5 also makes use of inter-operation time offsets to impose an additional time constraint on when the resource capacity is going to be required during the course of the rough-cut operation. For example, a first $RCCR_1$ 528 for rough-cut operation 504 has an offset 532 from the end of the rough-cut operation 504. This means that, for planning purposes, the first $RCCR_1$ are going to be required during a time period extending from the beginning of the rough-cut operation to the start of where the offset 532 begins. As such, it may be that the $RCCR_1$ 528 may be required during execution operation 518, and so the $RCCR_1$ 528 will be needed, generally, in the first half of the rough-cut operation 504. By using the offset 532, the $RCCR_1$ 528 is constrained to be scheduled not only within the time constraints of when the rough-cut operation 504 is scheduled, but also within the additional time constraint imposed by the offset 532. A second $RCCR_2$ 530 for the second rough-cut operation 504 has an offset 534 that extends from the beginning of the rough-cut operation 504 to roughly half way through the rough-cut operation 504. As such, the $RCCR_2$ 530 is constrained to be scheduled within generally the latter half of the rough-cut operation 504 time duration. This may be, for example, that the $RCCR_2$ 530 is imposed by the execution operation 520.

As discussed previously, there may be RCCRs that are aggregations of resource capacity requirements that arise in multiple execution operations but in the same rough-cut operation. These aggregated resource capacity requirements may be viewed as a single RCCR, although it still may be desirable in some cases to impose offsets to further restrict the time during which the RCCR may be scheduled in a planning-level calendar for the aggregated resource.

A RCCR, as is the case with RCCR1 528, generally may have a time duration associated with it that is shorter than a time period imposed by the rough-cut operation and any offsets. This provides some level of flexibility in scheduling the resources. In some cases, the constraints imposed by the offsets may be tightened or relaxed, dependent on how little time or how much extra time a planner may want to provide to ensure that execution is performed within time frames that are planned in planning and execution.

Figure 6:
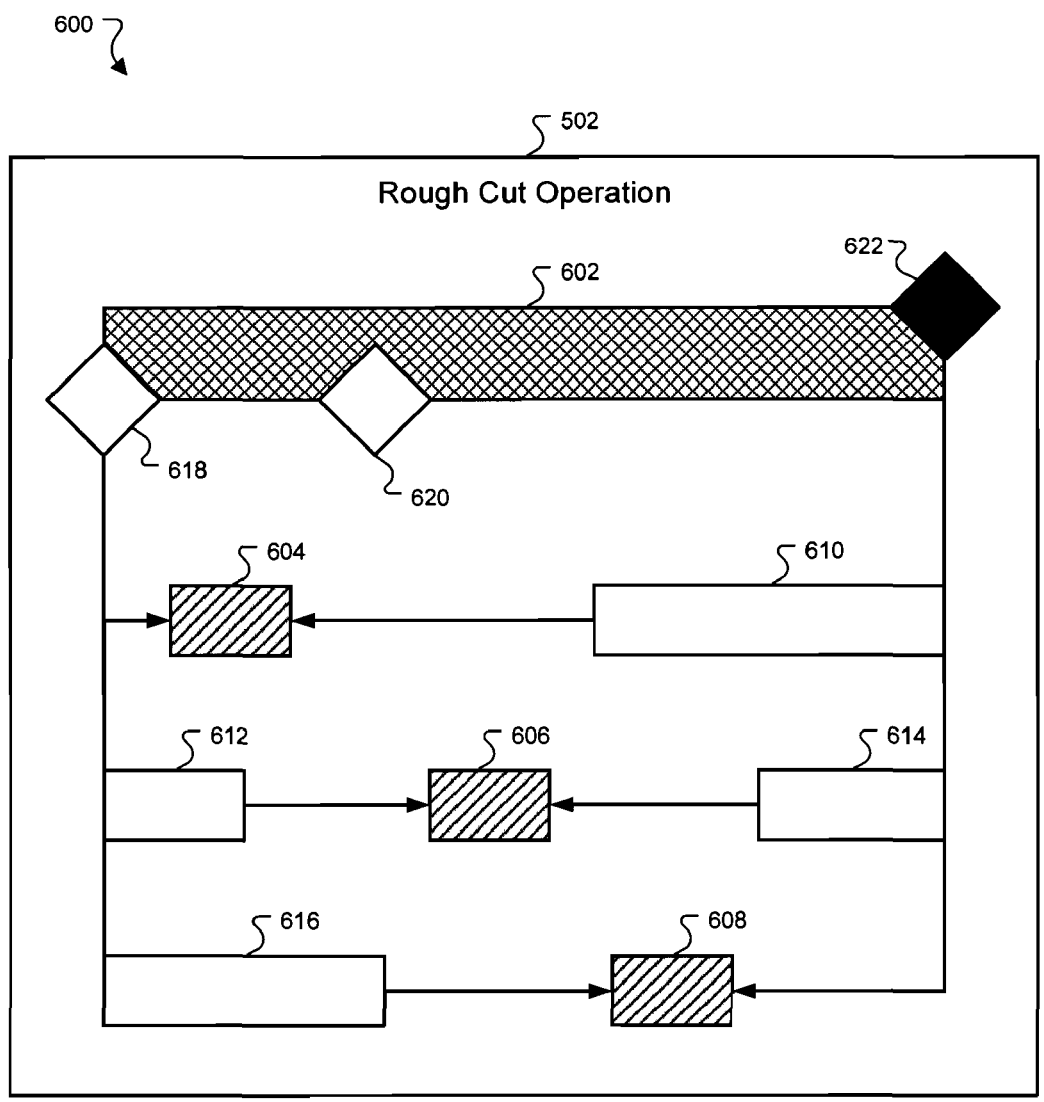
FIG. 6 is a diagram of an exemplary structure of a rough-cut operation.

Referring now to FIG. 6, an exemplary data structure 600 of the rough-cut operation 502 is shown. Different operations, user selections, and other factors may result in different arrangements of the data structure 600. The rough-cut operation 502 includes a header activity duration 602. The header activity duration 602 comprises a lead time of one or more execution operations that are aggregated in the rough-cut operation 502. For example, in the rough-cut operation 502 shown in FIG. 6, the header activity duration 602 may include the lead time of the operations 512, 514 and 516 shown in FIG. 5. Additional to the processing time of the execution operations, the header activity duration 602 may also include some amount of buffer time. The buffer time provides some amount of time beyond that which is absolutely needed to perform the execution operations.

The rough-cut operation 502 includes RCCRs 604, 606 and 608. The RCCRs 604, 606, 608 may only include the capacity requirement of planning-relevant operations. For example, the RCCR 604 may be modeled in a single requirement that may only include the planning relevant requirements in a setup requirement, a produce requirement, and a teardown requirement of the operation 512. In the depicted embodiment, the RCCRs 604, 606 and 608 are not related to each other. Therefore, there is no time relationship that links the RCCRs 604, 606, 608 together to establish an exact sequence of operations. A rough sequential relationship may be established by the aid of offsets.

The rough-cut operation 502 includes offsets 610, 612, 614 and 616 to impose a rough sequential relationship between the RCCRs 604, 606 and 608. The offsets 610, 612, 614 and 616 may specify time relationships between the RCCRs 604, 606 and 608 and the header activity duration 602. In one example, the offset 612 may specify a time relationship between the start of the rough-cut operation 502 and the start of the execution of the operation for the RCCR 606. In another example, the offset 614 may specify a time relationship between the end of the operation of the RCCR 606 and the end of the rough-cut operation 502. By adjusting the offsets 610, 612, 614 and 616, the sequential relationships between the RCCRs 604, 606 and 608 may be established. For example, the supply planning module 108 may specify the operation represented by the RCCR 608 to be executed later than the operation represented by the RCCR 606 by specifying the offset 616 to be longer than the offset 614. The offsets 610, 612, 614 and 616 may be automatically set in the routing database 110 (FIG. 1A) and manually adjusted by planning users. A user may decrease the value of the offsets 610, 612, 614 and 616 to schedule more rough-cut operations into a resource. A user may also increase the value of the offsets 610, 612, 614 and 616 to boost the likelihood of feasibility of the generated plan.

Some rough-cut operations may include one or more input nodes, and/or one or more output nodes. In this example, the rough-cut operation 502 includes two input nodes 618 and 620, and an output node 622. The input nodes 618 and 620 and the output node 622 represent the material inflow and material outflow during the rough-cut operation 502. The input nodes 618 and 620 and the output node 622 are linked to the header activity duration 602 to provide positive or negative offsets in the rough-cut operations 502. Further, in some embodiments, the input nodes 618 and 620 and the output node 622 may provide a link for the rough-cut operation 502 to link with other planning documents (e.g., rough-cut operations in other levels, external procurement proposals, purchase orders), which may include input or output nodes in their structure. For example, a purchase order may include the input node 618. When the supply planning module 108 schedules the rough-cut operation 502 to be executed in a specific time, the processing platform 102 may use to link provided by the input node 618 to find out that the purchase order may also need to be scheduled to provide the required material for the rough-cut operation 502.

Figure 7:
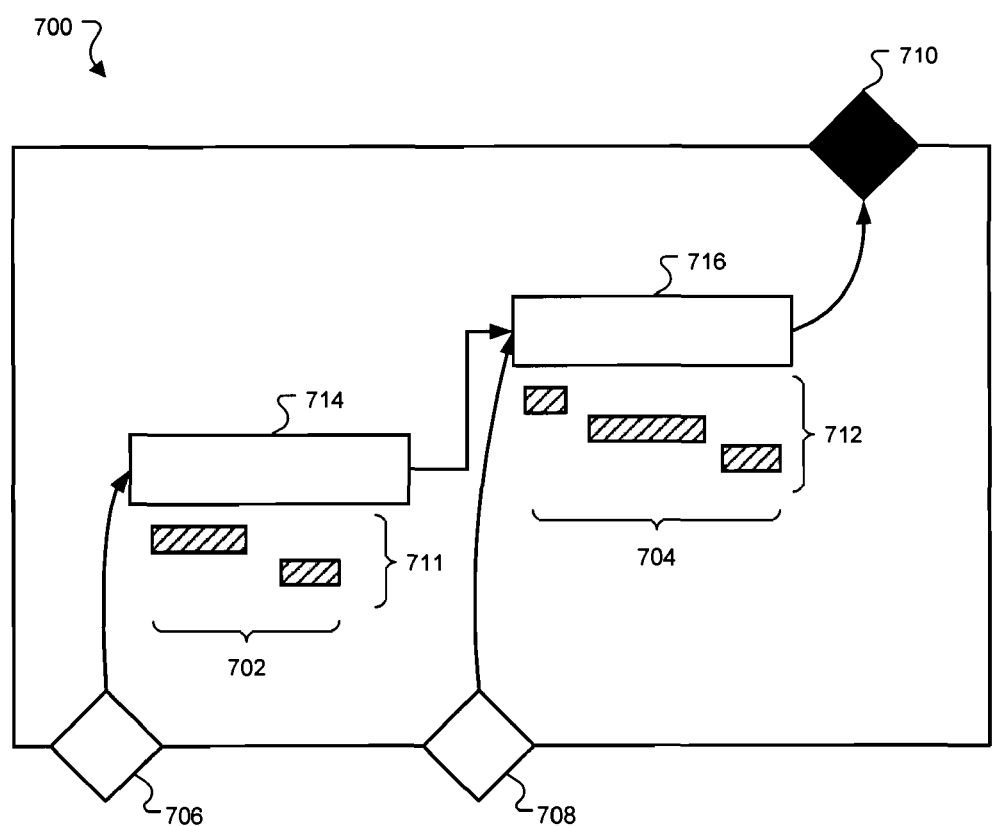
FIG. 7 is a diagram of a planned production order including rough-cut operations.

FIG. 7 shows an exemplary planned production order 700 that may be generated by the supply planning module 108 during planning operation. In this particular example, the planned production order 700 includes two rough-cut operations 702 and 704. The planned production order 700 also includes input nodes 706 and 708, and an output node 710 that may show the material input and end-product output in the planned production order 700. The rough-cut operations 702 and 704 may include RCCRs 711 and 712, and header activity durations 714 and 716.

In some embodiments, a planning algorithm may generate a timing schedule and a capacity requirement schedule using the information given in the exemplary planned production order 700. Time scheduling of the planning algorithm may work only with the header activity durations 714 and 716. The header activity durations 714 and 716 may represent the durations of the rough-cut operations 702 and 704 as a whole. A planning user or the planning algorithm may perform actions, such as, deletion, rescheduling, mode selection, on the header activity durations 714 and 716. For example, a user may delete a RCCR of a rough-cut operation is the user deems the RCCR to be not planning relevant. In another example, a user may reschedule the header activity duration 714 by rescheduling the occurrence of the rough-cut operation 702. In a further example, a user may change a header activity by selecting different modes in execution operation.

Capacity requirement scheduling of the planning algorithm may be related to the RCCRs 711 and 712. In one implementation, a capacity requirement from a supply planning point of view is a requirement of a production planning order for a resource, such as machine tools or human resources. These resource capacity requirements are derived from the RCCRs. A material requirement is a requirement for raw materials or semi-finished goods, for example. The material requirements are derived or calculated, in this example, from the input nodes of the rough-cut operations. A planning user may not be able to adjust the RCCRs 711 and 712 directly. However, in some embodiments, the actions performed on the header activity durations 714 and 716 may trigger automatic adjustments on the RCCRs 711 and 712. For example, the material requirement schedule related to the RCCRs 711 may change if a user reschedules the rough-cut operation 702. During planning, some rough-cut operations may not be scheduled due to, for example, lack of capacity or other constraints. In this case, in some embodiments, the planning algorithm may automatically reduce buffer time to fit the rough-cut operation into the constraints. While in one implementation a planning user may not be able to break a rough-cut operation into smaller operations for scheduling, a RCCR may, in some implementations, be broken into smaller units for that purpose.

Figure 8:
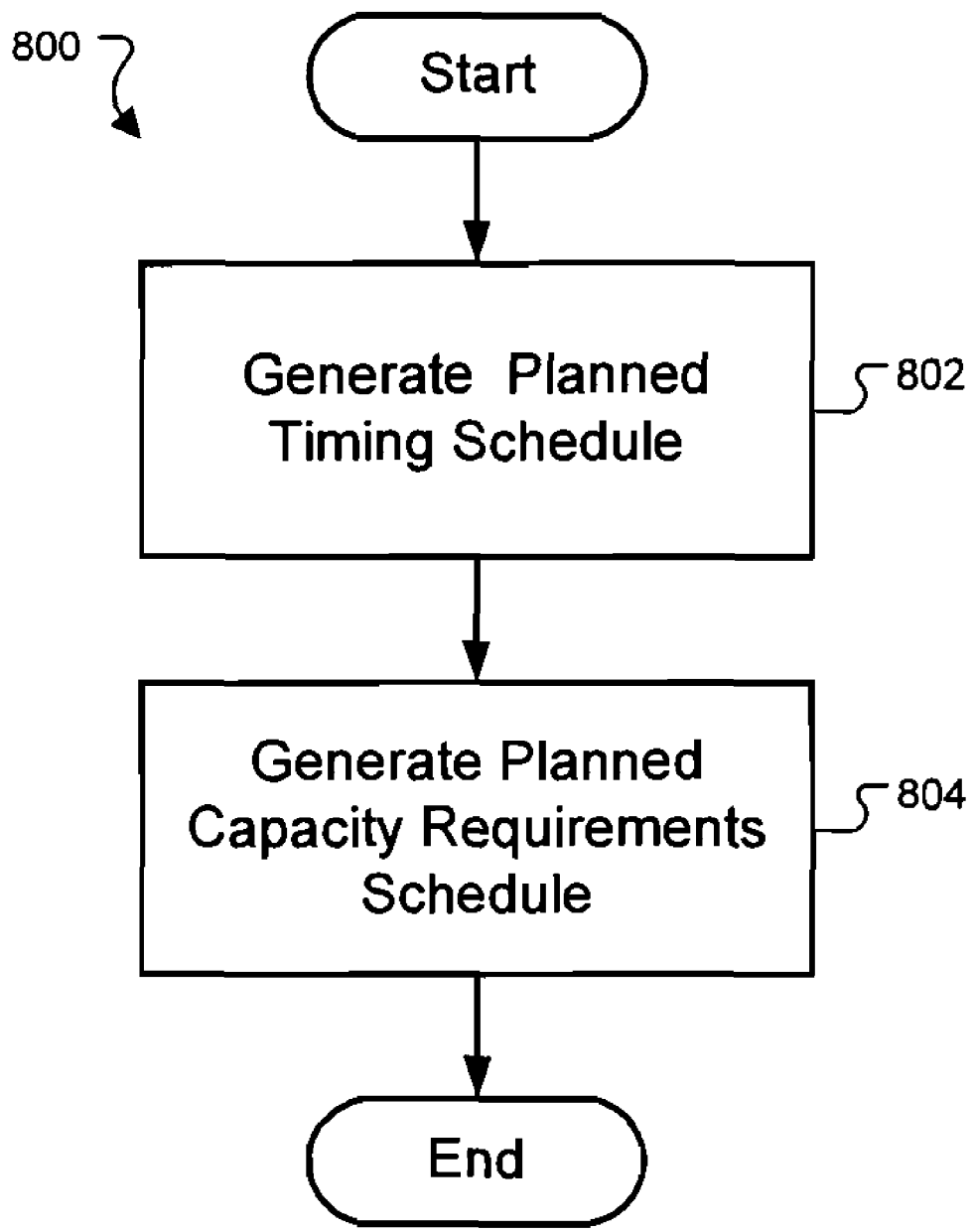
FIG. 8 is a flow chart of a computer-implemented method showing exemplary steps for generating planned production order.

Referring now to FIG. 8, a flow chart is shown that depicts an exemplary method 800 for performing a planning operation for a production process modeled for execution control as multiple separate sequential production operations. The method 800 may be preformed by a manufacturing computing system such as the system 102 in FIG. 1A. In some embodiments, the method 800 may be performed by the system 102 during the execution of the exemplary method 400. In other embodiments, the method 800 may be executed separately when a planning data, such as rough-cut operation routing, demand information, lead-time requirements, capacity requirements, start and end time requirements, and other information, are available. The computing system 102 may then plan and generate a planning document, such as an electronic production order, a purchasing order, or other planning documents, for execution.

In step 802, the method 800 may generate a planned timing schedule for each rough-cut operation to execute a production process to fulfill the received demand information. For example, the method 800 may consider the header activity durations of each of the rough-cut operations in the production process, the timing relationship between the rough-cut operations, and the production capacity of the manufacturing environment 104 to generate a planned timing schedule. In some embodiments, the planning algorithm may use the aggregated duration for each of the rough-cut operations and a manually or automatically selected time relationship between consecutive rough-cut operations to generate the timing schedule.

Separately, the method 800 may, in step 804, generate a planned capacity requirements schedule determined from capacity requirements, such as material requirements or resource requirements, associated with each execution operation and the offset defined for each execution operation. For example, when the method 800 is calculating the material requirements incurred by the rough-cut operation 502, some of the RCCRs 604, 606 and 608 may not contain planning relevant timing information and may be not considered in the timing schedule planning. However, the method 800 may still determine the capacity requirement incurred by the rough-cut operation 502 from the RCCRs 604, 606 and 608 and the offsets 610, 612, 614 and 616. At a later time, the generated timing schedule and the generated capacity requirement may be released to the execution user to perform the production process to fulfill the received demand information, for example, in a production order.

Figure 9:
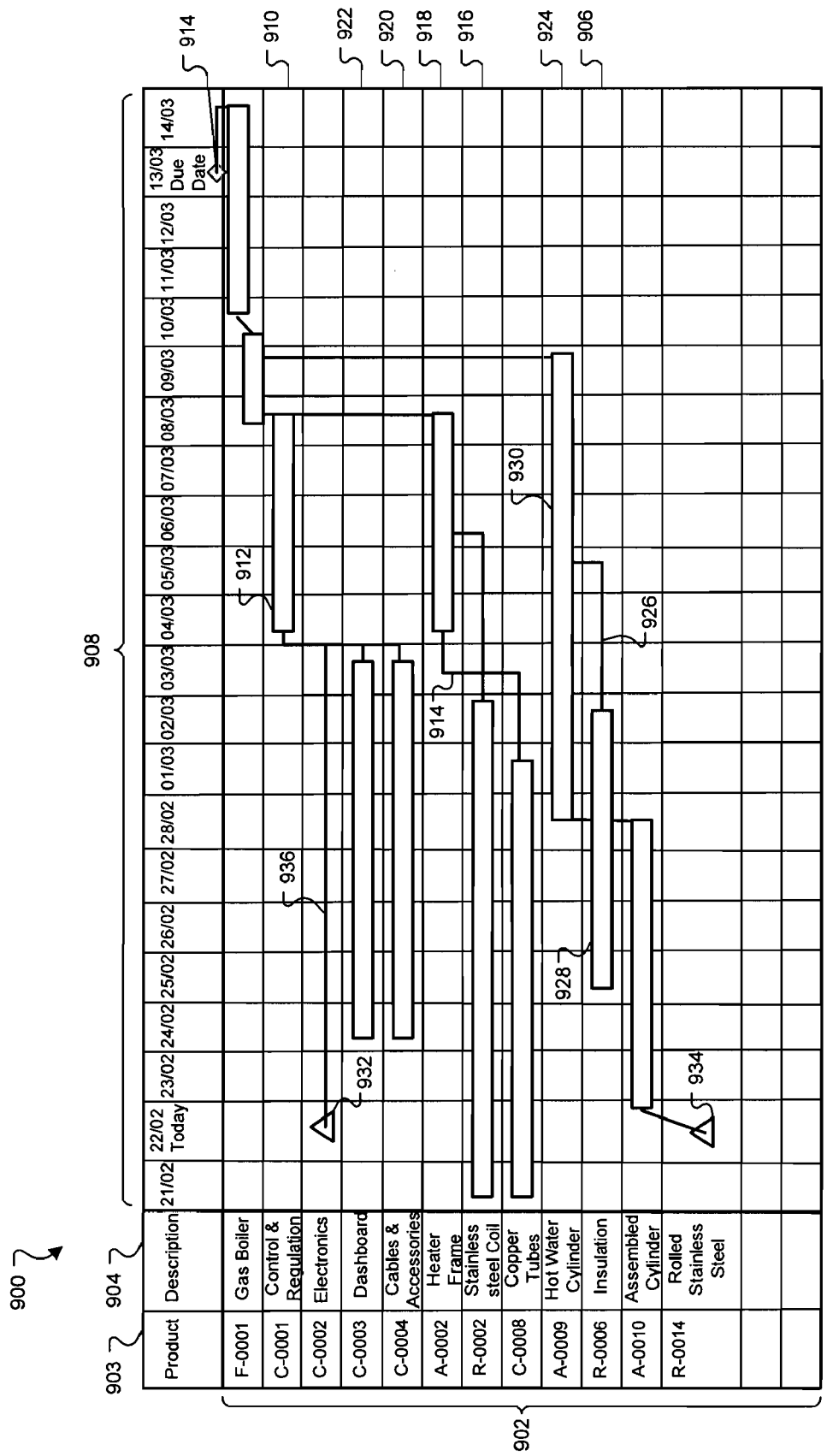
FIG. 9 is a graph of an exemplary Gantt chart to provide visual presentation of the production process schedule on planning boards.

Referring now to FIG. 9, an exemplary Gantt chart 900 may be generated to provide visual presentation of the production process schedule on planning boards. Many different types of such planning boards may be used, and it will be appreciated that such boards may be used to present rough-cut operations as described in this document. A user may visualize the timing of occurrences for material and resource requirements in the Gantt chart 900. In the depicted embodiment, the Gantt chart 900 shows the timing of the material or resource requirement within the rough-cut determined timing. The Gantt chart 900 includes Rows 902 to represent the materials needed to fulfill the production order. The Gantt chart 900 also includes a product column 903 and a description column 904. The product column 903 includes reference numbers of the material in the production order and the description column 904 includes brief descriptions of the material. For example, the row 906 may be for "insulation," which has a product identification of R-0006. The Gantt chart 900 also includes date columns 908 along the top. A scheduled time for each of the included material requirements (indicated by the rows 902) may be represented by an activity bar, which has a left end that marks the expected start date of the planning operation and a right end that marks the expected completion date of the operation where the material is needed. In some embodiments, the header activity duration 602 (FIG. 6) may directly correspond to the length of the activity bars. As an example, material C-0001 may be used in an operation with a header activity duration of four days. In the Gantt chart 900, an activity bar 912 may indicate that the "control and regulation" material may be expected to be needed during a period from March 4th to March 8th.

The Gantt chart 900 includes lines that connect the activity bars to represent time relationship and material flow relationships. The material requirements in the Gantt chart may run sequentially, in parallel, or overlapping. These relationships between the operations may also be represented by the lines connecting the activity bars in the Gantt chart 900. In one example, an line 914 may indicate a sequential relationship between a material requirement represented by a row 916 and another material requirement represented by a row 918. In another example, the Gantt chart 900 may use a row 920 to represent a material, a diamond 914 as a material requirement, a triangle such as 932 and 934 as a material supply from external procurement, and a rectangle as a production order which produces the material of the row 920 and may have additional inputs (such as material requirements). A material generated by row 922, for example, is shown to be needed at the same time by connecting the end of two activity bars in the rows 920, 922. In a further example, the Gantt chart 900 may indicate an overlapping relationship between the material requirement represented by the row 906 and a material requirement represented by a row 924 by connecting a line 926 from the end of an activity bar 928 to the middle of an activity bar 930.

The Gantt chart 900 includes two material input nodes 932 and 934, which are placed in the expected date of arrival of the materials. The lines in the Gantt chart 900 may indicate the material flow by connecting the material input nodes 932 and 934 to the activity bars. For example, an arc 936 may indicate the material "electronics" may be processed in the activity represent by the row 910. The Gantt chart 900 also includes an output node 938 that is placed on the due date of the production order, indicating the expected release date of the end-product. The Gantt chart 900 includes a line 940 that may indicate the material relationship between the production operations and the end-product. In the depicted example, the end-product may be completed when the rough-cut operation in which 942 is required is completed, which is represented by the arc 940.

Figure 10:
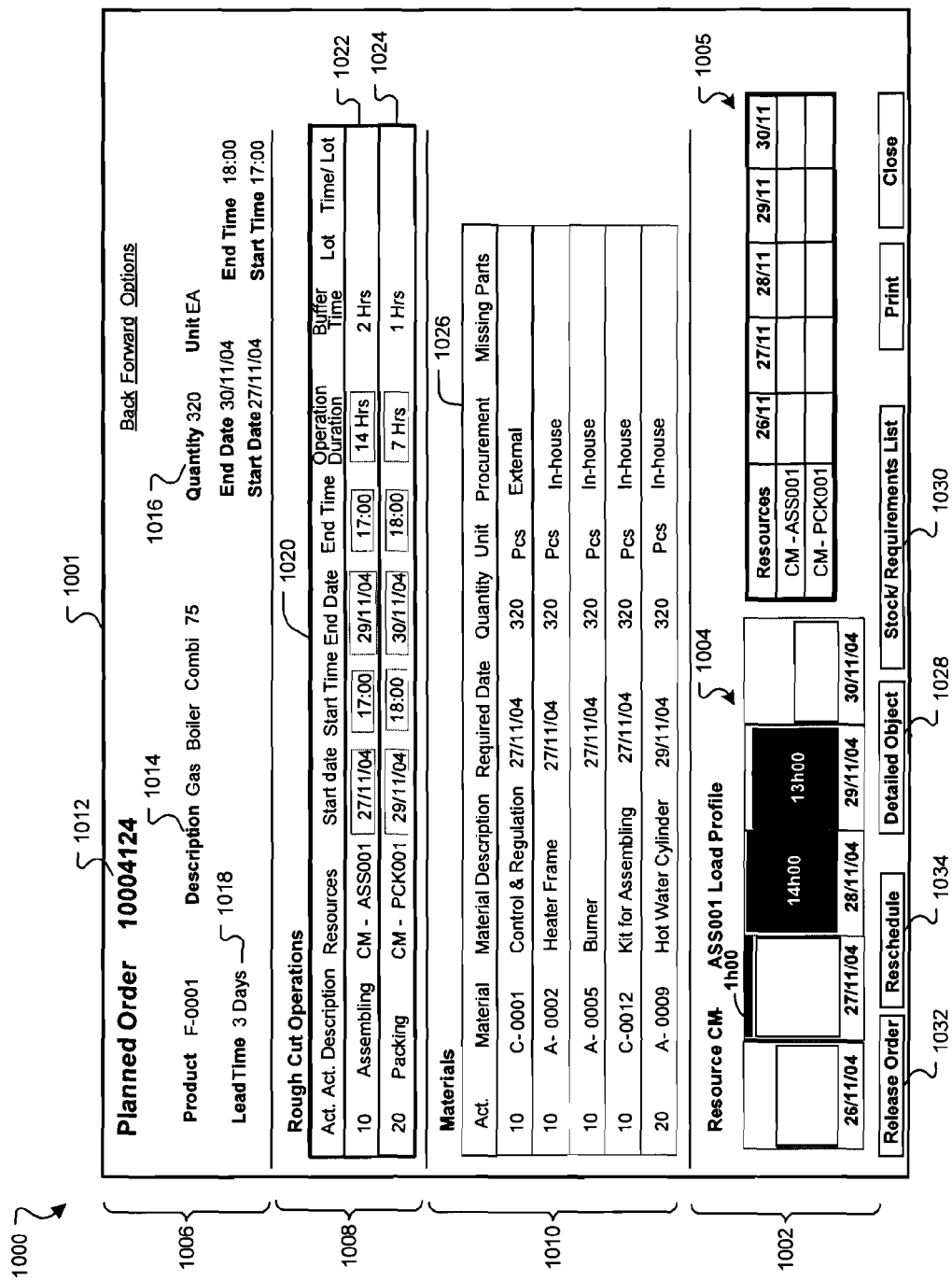
FIG. 10 is a user interface of an exemplary planning document of a production order.

Referring to FIG. 10, a user may visualize an exemplary production order 1000 in a planning document 1001. A controlling user, such as a user controlling the execution of the production order 1000 in the production floor 104 (FIG. 1), may review the planning document 1001 and process the production order 1000 based on information provided in the planning document 1001. The planning document 1001 includes a resource area 1002 in which user may visualize RCCRs as capacity load profiles of resources. The planning document 1001 may display a histogram 1004 to show the load profile of the resource usage during the production period. The resource area 1002 may also include a resource table 1005 which may contain information on the resource availability on each day during the scheduled time for production.

A planning user may use the planning document 1001 to obtain a rough idea on the schedule of the production order 1000 in a summary area 1006, details of the rough-cut operations in a rough-cut operation area 1008, and details of the material in a materials area 1010. The summary area 1006 may include an order number 1012 and a description 1014 of the production order 1000. In this example, the production order 1000 is related to a production of gas boiler. The summary area 1006 includes a quantity 1016. For example, the production order 1000 may specify a demand for 320 gas boilers. The summary area 1006 may also include a lead time 1018 that may be the result from rough-cut operation planning. For example, the lead time 1018 may be calculated by adding all rough-cut operations' header activity durations and offset time in the production order. Additionally, the summary area 1006 may also indicate the scheduled start and end time.

The rough-cut operation area 1008 includes a table 1020. The table 1020 may include some or all of the rough-cut operations in the production order 1000. In this example, the table 1020 includes two rough-cut operations, an assembling operation 1022 and a packing operation 1024. The table 1020 includes information, such as resources required, scheduled start and end time, operation duration, buffer time, and lot size of the rough-cut operations 1022, 1024. These information may be obtained from the rough-cut operation planning For example, the buffer time may be obtained from the user during the generation procedure of the production order 1000. The materials area 1010 may include a table 1026 that shows information on materials used in the production order 1000. In this example, the table 1026 includes information such as require date, quantity required, and procurement of each of the required materials. The material requirements may be computed separately from the computation of the lead time requirement.

A planning user may obtain addition detail on some of the data by using a detail object button 1028 and a stock/requirements list button 1030. The planning user may select one of the objects, such as the rough-cut operation 1022, and select the button 1028 to show details in the rough-cut operation 1022. For example, information on execution operations included in the rough-cut operation 1022 may be displayed. Also, by selecting the button 1030, the planning user may visualize the list of stock requirement for the production order 1000. A planning user may also use the planning document 1001 to process the planned production order. In this embodiment, the planning document 1001 includes a release order button 1032 and a reschedule button 1034. In one example, if the planning user approves the production order 1000, the planning user may select the release order button 1032 to release the order to the production floor. In another example, if the planning user does not approve schedule of the production order 1000, the planning user may select the reschedule order button 1034 to reschedule the order to another time.

FIGS. 11-15 describe in more detail the manufacturing process master data, including routing information, that may be created by a system user and stored in a master data repository, such as repository 110 in the example manufacturing system 102 shown in FIGS. 1A-D. The master data, as discussed previously, is not intended to be changed on a frequent basis (although it may be), but rather is called upon by modules that utilize the data during a run-time operation of computing processes that support the operation of the manufacturing operation. For example, as discussed previously, the supply planning component 108 and the manufacturing execution component 118 of the FIG. 1 system may make use of the predefined master data.

In one implementation, the master data may include what may be referred to as a routing element for the manufacturing process, which is a description of a manufacturing, or production, process to manufacture a product with all of the manufacturing steps to transform one or more input materials to one or more end products. The routing element of the production process master data may also specify all of the needed resources, materials, and instructions for the manufacturing process.

The manufacturing process master data may also include what may be referred to as operation elements, which describe an enclosed and single transformation process of a product at a special resource with the entire manufacturing process described by a routing element. The operation may include a summary of the function of the operation and an arrangement of different activities. An entire operation may correspond to the special resource that is used by the operation.

The master data may also include what may be referred to as activity elements, which may represent the elementary actions that are necessary to process and plan a single manufacturing step at a resource in connection with other activities. In this implementation, an activity is always part of an operation and can be performed alone or can be a part of a linear sequence of activities. Activities may also have different types that specify their purpose in the production process. Example types may be setup, production, teardown, preparation, quality check, parameter determination, etc. Every activity may have its own additional resource requirement.

The master data may also include what may be referred to as a step element. A step may be a smaller part of an activity, and provide a more detailed description for execution purposes. Step elements may give information for production task generation and define user interface views used by operators during the manufacturing process.

Also, what may be referred to as technical elements may be defined below activities. For example, the technical element may specify that only linear sequences of steps are definable. The technical element may also, for example, be a holder of assigned instructions, documents and links, process parameters, measurement points, and a user interface connection.

Figure 11:
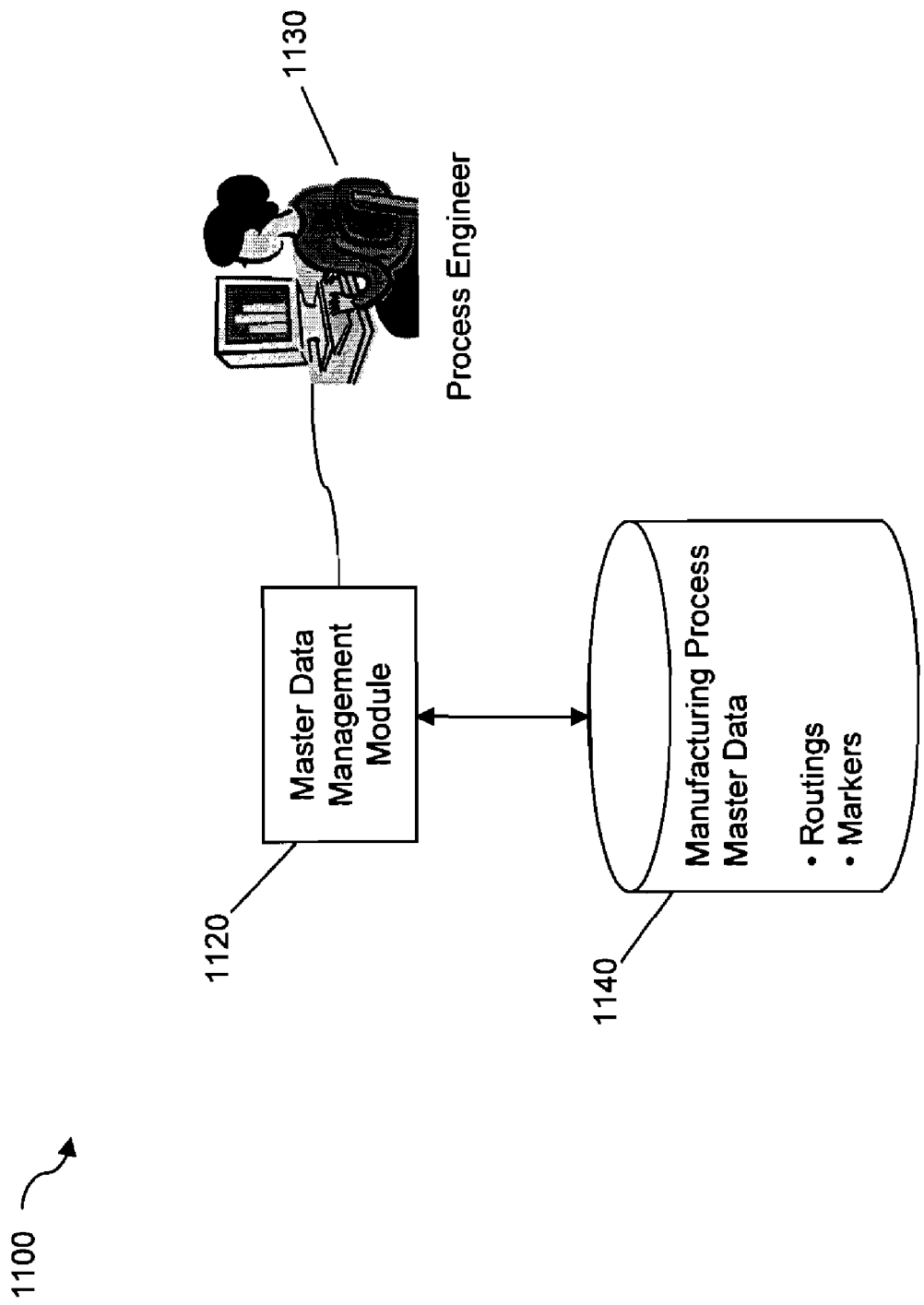
FIG. 11 is a block diagram of a system for creating and maintaining manufacturing process master data.

FIG. 11 is a block diagram of a maintenance computing system 1100 which may allow a user to create and maintain the master data. A process engineer 1130, who may be intimately familiar with the particular procedures of a manufacturing environment, may utilize a workstation to access a master data management module 1120, where the master data may be configured, and subsequently saved in a repository of manufacturing process master data 1140 (or repository 110 in the FIG. 1 system). The process engineer 1130 may make use of the master data management module 1120 in such a way that they may include as many manufacturing operations as are necessary in order to fully describe the steps taken to produce a particular product, utilizing the resources of the environment. Example operations in a manufacturing process may be drilling, grinding, and assembling or packing.

As an example, the process engineer 1130 may configure a routing scenario for producing bowling balls, where the planning activities may include a forklift that brings stock to a drilling machine, a grinding process that shapes the balls, and a drilling process that drills holes in the balls. Additionally, the scenario may include subsequent production activities such as packaging the finished product in a box filled with protective material. In this example, the process engineer 1130 may be fully aware of each of these steps, and may include in the master data describing the overall production of bowling balls, the maximum amount of stock the forklift can bring to the grinder in one trip, the amount of time it takes to grind the balls, the efficiency of the drilling process, and the resources it may take to package the product. This example illustrates four "procedures" for describing the overall routing process of producing bowling balls: transport of stock, grinding, drilling, and packaging.

Markers may also be defined in the master data. Markers are master data database objects that may be used, in one example, in such a way that they may be incorporated into a routing scheme so as to "group" similar procedures within a defined routing sequence into a singular representation of the group activities. Continuing with the above example, markers (M) may be defined between the operations of transport of stock and grinding, and between drilling and packaging (transportation of stock →M →grinding →drilling →M →packaging); in this case, the grinding and drilling production processes may be represented as one production process whose aggregated attributes combine to form a single production activity. In reality, producing bowling balls may involve hundreds of planning and production steps, and grouping similar steps together using marker master data may allow increased efficiency in many regards of a manufacturing environment.

The marker database object may have different or multiple defined roles. For example, one role may be a planning marker, which serves as a border of planning segments in routing, as discussed previously in this document. Another role may be a reporting point, which is a position in the manufacturing process for counting of actual production quantities. Yet another role is an execution marker, which serves as a border for an execution task definition for a worker or which serves as a production step. A production step may divide a single routing in master data into different production orders in execution. That means in master data creation a user is not restricted to a pure one to one relation between the routing and an order in execution. This may be especially useful if different manufacturing departments are involved in the production process for the same product. By setting of production step markers, it is possible to provide different execution orders to each departments. Another role for a marker may be to serve as a limiter, such as a start or end of a routing. Other roles are also possible.

In a similar fashion for preparing routing master data in FIG. 2, a process engineer 1130, who may be familiar with the manufacturing process of a manufacturing environment, may utilize a master data management module 1120 to define markers and store them in a manufacturing process master data repository 1140 so that the markers may be utilized later during a run-time operation of computing systems that make use of the master data.

Figure 12:
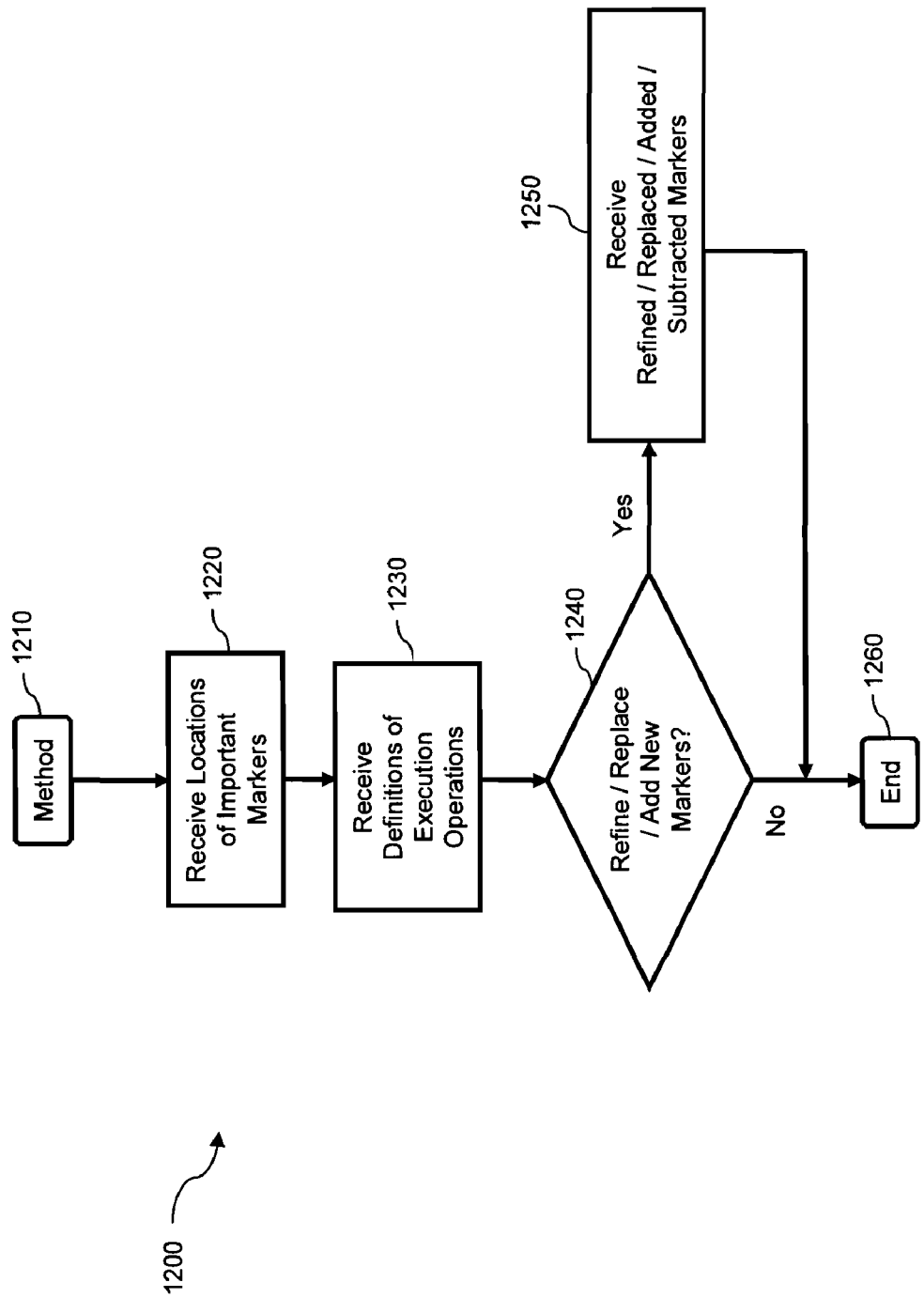
FIG. 12 is a flow chart of a computer-implemented method that may be carried out in the system of FIG. 11 for creating and maintaining manufacturing process master data.

FIG. 12 is a flow chart 1200, which may describe the sequence, or method 1210, for creating master data. First, at step 1220 (which may be optional if step 1210 is performed), the system may receive one or more user inputs that create important markers for a manufacturing process. This may be done before any of the routing elements and operations are defined in the master data for the manufacturing process. Under this approach, dividing points in a manufacturing process that may be important for some run-time process such as a planning process that uses the master data may be defined up front. As one example, the markers that may be defined for use as a planning function. Next, at step 1230, the system may receive one or more user inputs that define the execution operations of the manufacturing and the linkages between the operations. This is done within the framework of the markers already defined for the manufacturing process.

The next step of the method 1210 is an optional step where additional markers may be defined or existing markers moved even after the definitions of the execution operations of the manufacturing process. In step 1240, it is determined whether a user wants to refine, replace or add new markers. If yes, then processing proceeds to step 1250 where user input is received of the refinement, replacement, addition, or subtraction of markers. This illustrates that the markers may be maintained even after an initial definition of the master data, and it illustrates that different types of markers (for example, for production steps) may be defined at the end of a design process, for example where planning type markers were used as a starting point for defining the master data that models the manufacturing process.

It is also possible that no markers will be set in the master data for the modeled manufacturing process. In such a case, the entire manufacturing process routing may be defined as a production step and also as a planning operation. As discussed previously, markers are points where planning activities, production step borders and operations meet each other. As an illustration of different types of markers, FIG. 3, discussed previously, shows, for example, a "Mark2" 318 defined within the modeled manufacturing process. The "Mark2" 318 is a marker object that has a defined role, or type, of a production step and also for planning. In other words, in an implementation where the marker is a database object with roles, the marker object "Mark2" has multiple defined roles. As is also shown in FIG. 3, production step markers may define an execution user interface view that may be displayed during execution of the manufacturing process, and planning markers may define a planning user interface view that may be displayed during a planning function.

Figure 13:
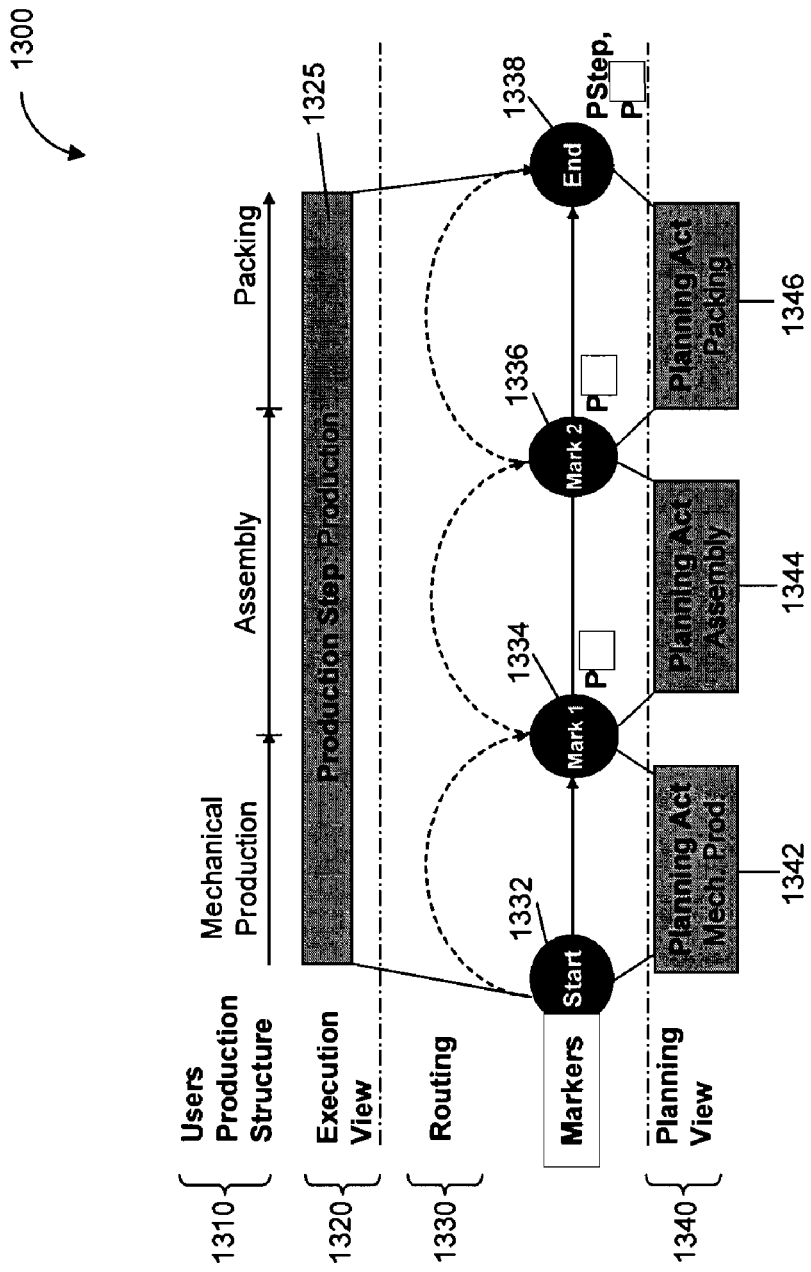
FIGS. 13-15 are conceptual depictions of an example of the method shown in the flow chart of FIG. 12.
Figure 14:
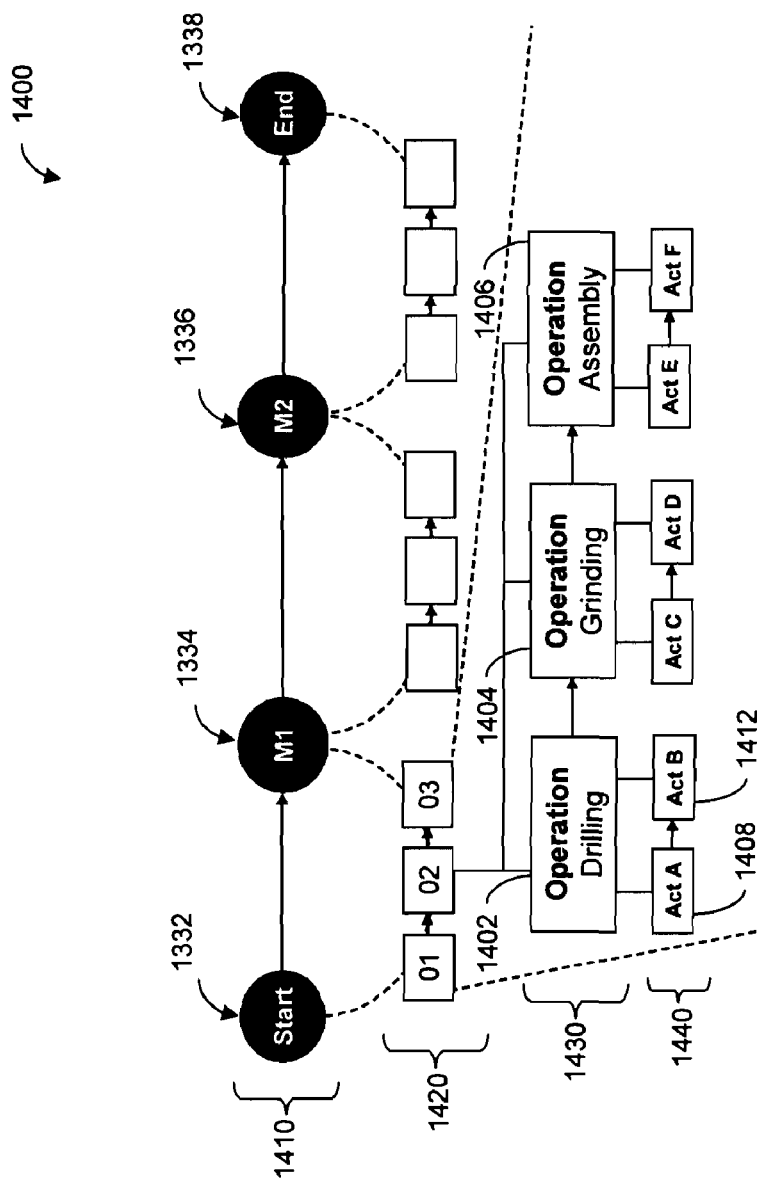
Figure 15:
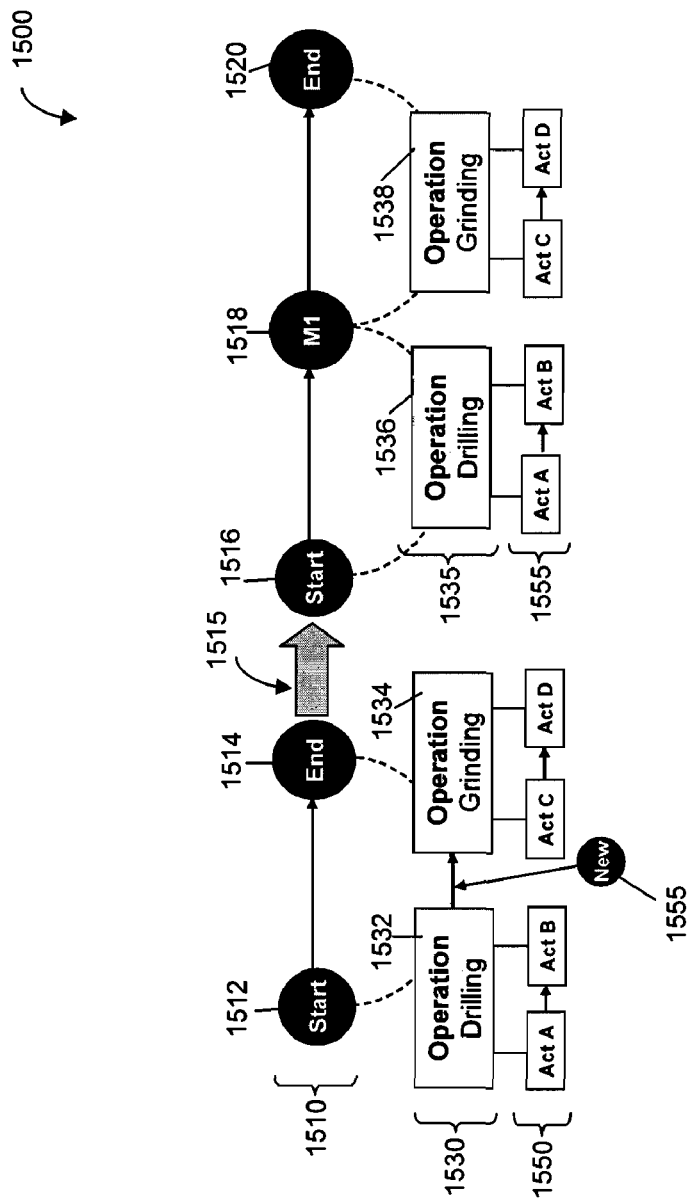

FIGS. 13-15 show a graphical representation for each of the individual steps of the method shown in FIG. 12. First, FIG. 13 shows the definition of important markers for a manufacturing process being modeled in master data (step 1220 of FIG. 12). This figure depicts a "rough to fine" approach to modeling where planning markers are defined for the manufacturing process before the operations and routing information between the defined markers are entered. FIG. 13 represents an exemplary manufacturing environment process 1300, which overall depicts the synthesis of product from beginning to end, which starts with mechanical production, then assembly, and finally packing (as shown on the users production structure 1310 shown in FIG. 13). FIG. 13 shows the definition of two planning markers, called "planning operation," or "PO," markers 1334 and 1336. A start marker 1332 at the beginning of the modeled process and an end marker 1338 may be defined by default.

The definition of the two planning markers 1334 and 1336 as shown in FIG. 13 defines three planning operations that will appear on a planning view 1340 during a run-time planning process during which the master data defining the manufacturing process gets used. The planning operations are, respectively from a beginning of the manufacturing process to an end of the manufacturing process, a mechanical production planning operation 1342, an assembly planning operation 1344, and a packing planning operation 1346. It deserves noting that no intermediate "production step," or "PStep," markers have been defined yet for the master data, and as such, at this time and with no further PStep markers being defined, there will only be one production step presented on an execution user interface view 1320 during a run-time execution process.

Next, FIG. 14 shows a definition of execution objects (step 1230 of FIG. 14) in yet the next step of a "rough to fine" modeling approach that began with FIG. 13. Here, execution operations are defined between the previously defined markers shown along line 1410. For example, between start marker 1332 and M1 marker 1334, three execution operations and their routings have been defined. The three operations are shown as operations 01, 02 and 03 in depiction 1420. In the blow-out depiction 1430 and 1440 of the operations shown at 1420, it is shown that operation 01 is a drilling operation 1402, operation 02 is a grinding operation 1404, and operation 03 is an assembly operation 1406. Under the operations shown at 1430, there are defined activities for the defined operations. The drilling operation 1402 has two defined activities, for example, activity A 1408 and activity B 1412. Given that multiple execution operations are defined between planning markers, a planning user interface view that makes use of the planning markers will have a level of granularity corresponding with the number of planning markers that are set, and there may be an aggregation capacity planning information for the operations between two planning markers.

Turning now to FIG. 15, there is shown a refinement of the marker definition (for example, step 1250 of FIG. 12). A refinement of routing with respect to there is next defined in the modeled manufacturing process in master data. In this example, a two-operation process (Drilling 1532 and Grinding 1534) has beginning and end production points defined by a Start 1512 and End 1514 marker. Each of the two operations 1530 is further defined by two acts 1550, as is the case in FIG. 14. The process 1500 represented is one in which a process engineer may have decided to insert a marker 1555 between the two operations 1532, 1534, to break the Drilling 1532 and Grinding 1534 operations into separate execution or planning objects. The new production process indicated by the arrow 1515 now includes a new marker 1518, and the Drilling 1536 and Grinding 1538 execution objects may be utilized for planning purposes individually, where previously, their aggregated production steps were represented singularly.

Referring back to FIG. 4 to illustrate a use of the markers defined in the master data, step 408 of receiving a user selection of markers for aggregation may be a selection of markers that have been predefined in the master data according to FIGS. 12-15. In such a case, an aggregation for purposes of a planning function, as described previously, may make use of the defined markers in the master data.

Figure 16:
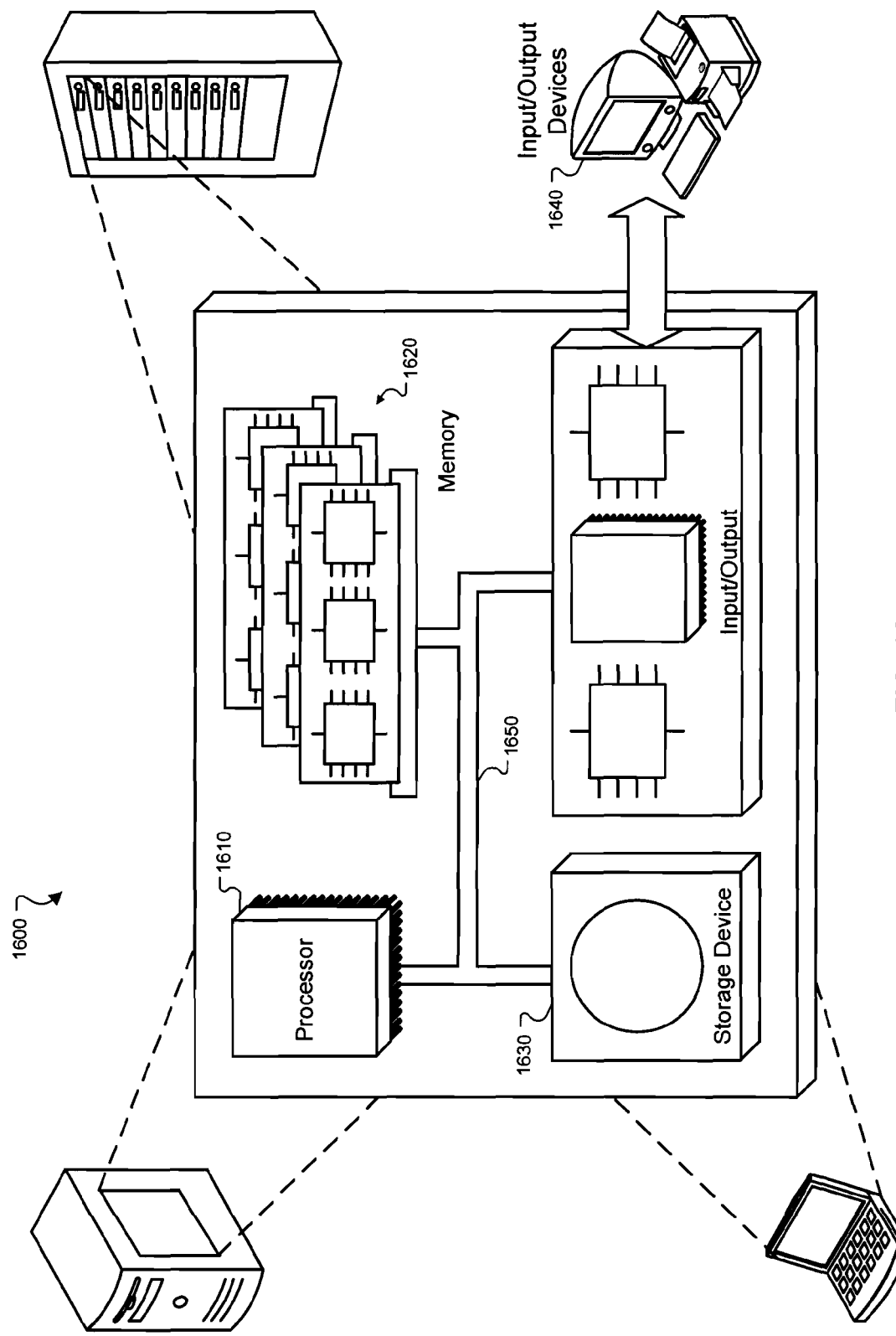
FIG. 16 is a block diagram of a computing system that may be used in the systems shown throughout this document and for executing computer-implemented methods described in this document.

FIG. 16 is a schematic diagram of a generic computer system 1600. The system 1600 can be used for the operations described in association with any of the computer-implemented methods described previously. The system 1600 includes a processor 1610, a memory 1620, a storage device 1630, and an input/output device 1640. Each of the components 1610, 1620, 1630, and 1640 are interconnected using a system bus 1650.

The processor 1610 is capable of processing instructions for execution within the system 1600. In one implementation, the processor 1610 is a single-threaded processor. In another implementation, the processor 1610 is a multi-threaded processor. The processor 1610 is capable of processing instructions stored in the memory 1620 or on the storage device 1630 to display graphical information for a user interface on the input/output device 1640.

The memory 1620 stores information within the system 1600. In one implementation, the memory 1620 is a computer-readable medium. In one implementation, the memory 1620 is a volatile memory unit. In another implementation, the memory 1620 is a non-volatile memory unit.

The storage device 1630 is capable of providing mass storage for the system 1600. In one implementation, the storage device 1630 is a computer-readable medium. In various different implementations, the storage device 1630 may be a floppy disk device, a hard disk device, an optical disk device, or a tape device.

The input/output device 1640 provides input/output operations for the system 1600. In one implementation, the input/output device 1640 includes a keyboard and/or pointing device. In another implementation, the input/output device 1640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method of defining and using marker points within a modeled manufacturing process routing that comprises multiple sequenced operations, the method comprising:
   receiving user input that defines marker points within the modeled manufacturing process routing and between sequential ones of the operations, the one or more marker points each defining a user-defined point within a manufacturing process;
   receiving user input that selects, for each defined marker point, one of multiple different defined types that each define a different use for a marker point, wherein (i) an execution type is selected for a set of the markers, and (ii) a planning type is selected for another at least one of the markers, wherein the planning type marker is located among the set of execution type markers and defines planning operations; and detecting, while operating a computing process that uses the manufacturing routing, if any marker points of a specified one type of the multiple different defined types have been defined in the manufacturing process routing, and if a marker point having the specified one type is detected, executing a predefined computing function that uses the detected marker point.

2. The computer-implemented method of claim 1, wherein another of the multiple different defined types comprises a reporting type for use in connection with a reporting function performed during execution of the manufacturing process.

3. A computer program product tangibly embodied in computer storage medium and comprising instructions that when executed by a processor perform a method of defining and using marker points within a modeled manufacturing process routing that comprises multiple sequenced operations, the method comprising:

receiving user input that defines marker points within the modeled manufacturing process routing and between sequential ones of the operations, the one or more marker points each defining a user-defined point within a manufacturing process;

receiving user input that selects, for each defined marker point, one of multiple different defined types that each define a different use for a marker point, wherein (i) an execution type is selected for a set of the markers, and (ii) a planning type is selected for another at least one of the markers, wherein the planning type marker is located among the set of execution type markers and defines planning operations; and detecting, while operating a computing process that uses the manufacturing routing, if any marker points of a specified one type of the multiple different defined types have been defined in the manufacturing process routing, and if a marker point having the specified one type is detected, executing a predefined computing function that uses the detected marker point.

4. The computer program product of claim 3, wherein another of the multiple different defined types comprises a reporting type for use in connection with a reporting function performed during execution of the manufacturing process.

5. A system for defining and using marker points within a modeled manufacturing process routing that comprises multiple sequenced operations, the system comprising:

one or more processors;

means for receiving user input that defines marker points within the modeled manufacturing process routing and between sequential ones of the operations, the one or more marker points each defining a user-defined point within a manufacturing process;

means for receiving user input that selects, for each defined marker point, one of multiple different defined types that each define a different use for a marker point, wherein (i) an execution type is selected for a set of the markers, and (ii) a planning type is selected for another at least one of the markers, wherein the planning type marker is located among the set of execution type markers and defines planning operations; and computer storage medium comprising instructions that when executed cause the at least one processor to detect, while operating a computing process that uses the manufacturing routing, if any marker points of a specified one type of the multiple different defined types have been defined in the manufacturing process routing, and if a marker point having the specified one type is detected, executing a predefined computing function that uses the detected marker point.

6. The system of claim 5, wherein another of the multiple different defined types comprises a reporting type for use in connection with a reporting function performed during execution of the manufacturing process.

* * * * *